(12) United States Patent
Tokuda et al.

(10) Patent No.: US 7,015,506 B2
(45) Date of Patent: Mar. 21, 2006

(54) COLOR FILTER SUBSTRATE AND DISPLAY DEVICE

(75) Inventors: Tsuyoshi Tokuda, Matsusaka (JP); Toshihide Tsubata, Matsusaka (JP); Toshifumi Yagi, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 94 days.

(21) Appl. No.: 10/763,184

(22) Filed: Jan. 26, 2004

(65) Prior Publication Data

US 2004/0150769 A1 Aug. 5, 2004

(30) Foreign Application Priority Data

Jan. 31, 2003 (JP) ............................. 2003-023657
Dec. 26, 2003 (JP) ............................. 2003-434624

(51) Int. Cl.
H01L 31/0376 (2006.01)
H01L 31/20 (2006.01)

(52) U.S. Cl. ............................. 257/59; 257/72; 257/88
(58) Field of Classification Search .................. 257/59, 257/72, 88–93
See application file for complete search history.

(56) References Cited

U.S. PATENT DOCUMENTS 6,797,982 B1 * 9/2004 Okada et al. ................. 257/59
6,885,028 B1 * 4/2005 Nishiki et al. ................ 257/59

FOREIGN PATENT DOCUMENTS

| JP | 03-198027 | 8/1991 |
| JP | 09-198027 | 8/1991 |
| JP | 07-159771 | 6/1995 |
| JP | 11-174430 | 7/1999 |
| JP | 2001-296523 | 10/2001 |
| JP | 2002-286927 | 10/2002 |

* cited by examiner

Primary Examiner—Cuong Nguyen
(74) Attorney, Agent, or Firm—Keating & Bennett, LLP

(57) ABSTRACT

A color filter substrate for a display device includes pixels arranged in columns and rows. The substrate includes color filters, each being associated with one of the pixels and including at least two A-color filters in a first color and at least two B-color filters in a second color. Each row is associated with a group of color filters including at least one of the A-color filters and at least one of the B-color filters. Each of the A-color and B-color filters has first and second sides defining a width in the row direction. The area SA of each A-color filter is greater than the area SB of each B-color filter. The first side of each B-color filter has at least one recess, and the first side of each B-color filter has a shape that is defined by forming a recess on the first side of each A-color filter toward the second side thereof in the row direction.

24 Claims, 15 Drawing Sheets

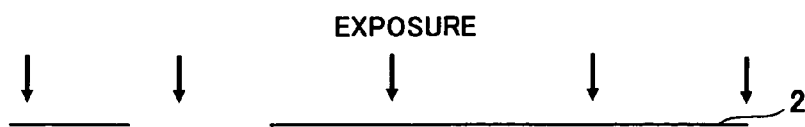
FIG. 7A
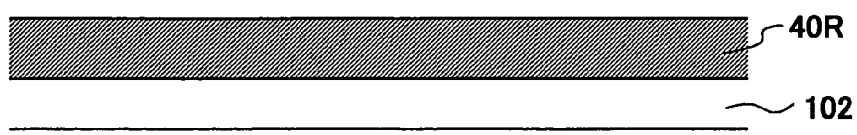
FIG. 7B
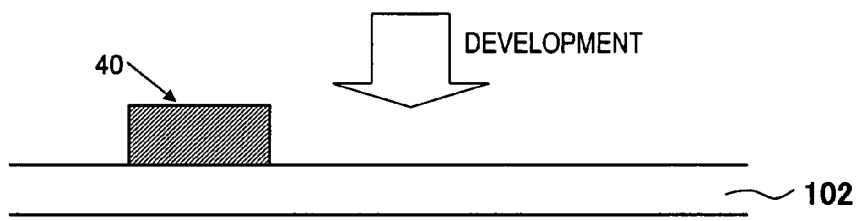
FIG. 7C
FIG. 7D
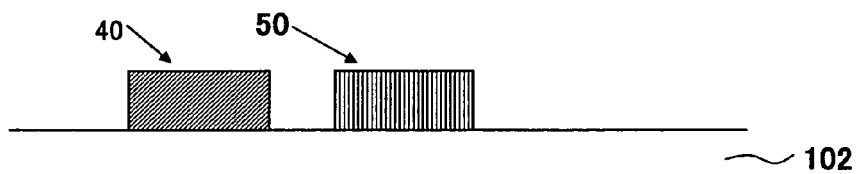
FIG. 7E
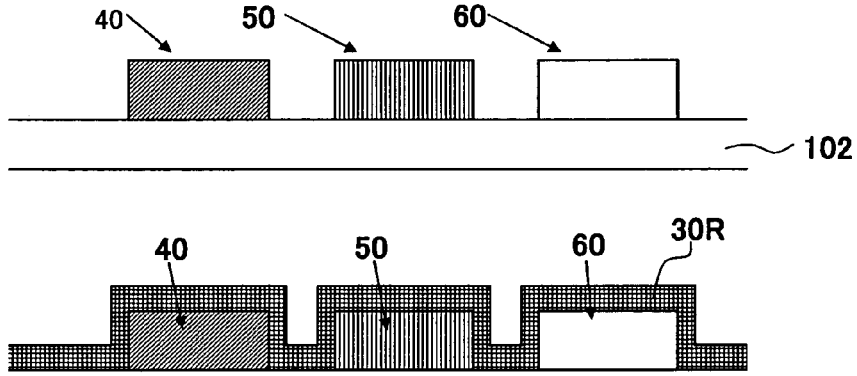
FIG. 7F
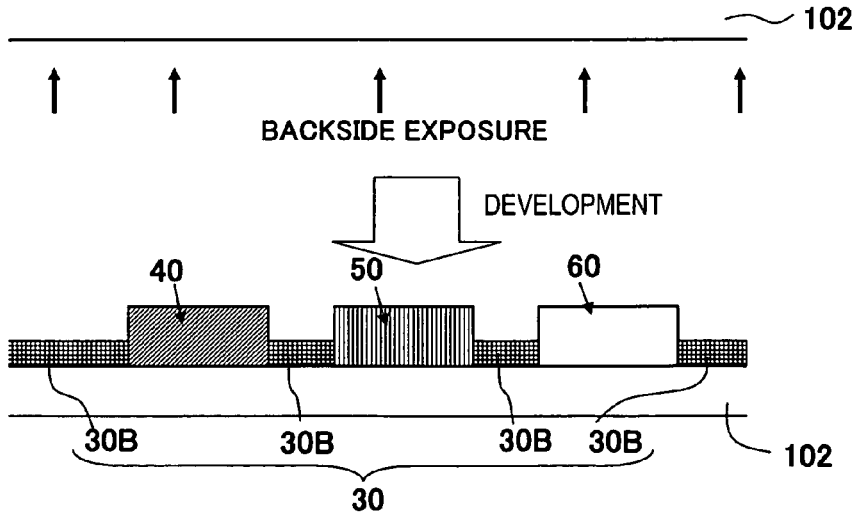

COLOR FILTER SUBSTRATE AND DISPLAY DEVICE

BACKGROUND OF THE INVENTION

1. Field of the Invention

The present invention relates to a method for fabricating a color filter substrate for use in a color liquid crystal display (LCD) and other display devices.

2. Description of the Related Art

LCDs are relatively small, thin and lightweight display devices with comparatively low power dissipation. By taking advantage of these features, LCDs are currently used extensively in a broad variety of electronic appliances. Among other things, active-matrix-addressed LCDs with switching elements are used particularly widely in office automation (OA) appliances such as personal computers, audiovisual (AV) appliances such as TV sets, and cell phones. Meanwhile, the size, definition, effective pixel area ratio (i.e., aperture ratio), color purity and other quality parameters of LCDs have recently been increased or improved significantly.

The structure of a normal active-matrix-addressed LCD will be described with reference to FIG. 15, which is a cross-sectional view thereof.

As shown in FIG. 15, the LCD 350 includes an active-matrix substrate 10 and a color filter substrate 300, which are arranged so as to face each other, and a liquid crystal layer 20 provided between these two substrates 10 and 300. Also, as viewed perpendicularly to the principal surface of any of these substrates, the LCD 350 has an (effective) display area and a non-effective-display area (i.e., picture frame area) that surrounds the display area.

The active-matrix substrate 10 includes a transparent insulating substrate 12 made of glass, for example, gate bus lines (not shown) to supply gate signals therethrough, source bus lines 14 to supply data signals therethrough, active components (not shown) such as thin-film transistors (TFTs) and transparent pixel electrodes 16. The gate bus lines, source bus lines 14, active components and pixel electrodes 16 are all provided on the substrate 12. The transparent pixel electrodes 16 are arranged in a matrix on the display area.

The color filter substrate 300 includes a transparent insulating substrate 302 of glass, for example, a color filter layer 390 consisting of red color filters 340, green color filters 350 and blue color filters 360, a light shielding layer 330 including a plurality of light shielding portions 330A and 330B, and a counter electrode (not shown). The color filter layer 390, light shielding layer 330 and counter electrode are all provided on the substrate 302. The red, green and blue color filters 340, 350 and 360 are arranged so as to face their associated transparent pixel electrodes 16 on the active matrix substrate 10. The light shielding layer (i.e., black matrix) 330 is arranged such that the light shielding portions 330A and 330B are arranged in the gaps between the respective color filters and in the picture frame area.

In this manner, a color filter substrate normally includes the three types of color filters, namely, red, green and blue color filters. Accordingly, the white chromaticity, for example, is determined by the intensities of light rays that have been transmitted through these three types of color filters. For that reason, to adjust the white chromaticity arbitrarily without decreasing the color purities of the respective colors, a color filter substrate, in which the ratio of the areas of three color filters of each set is adjusted appropriately (i.e., the ratio of the areas of color filters in the three colors is not one to one to one), was developed (see Japanese Laid-Open Publications Nos. 3-198027, 7-159771 and 11-174430, for example).

However, in fabricating a liquid crystal display device by bonding a color filter substrate and an active-matrix substrate together, misalignment may happen. For example, if a color filter substrate, on which color filters are arranged in stripes, has failed to be aligned with an active-matrix substrate in the pixel row direction (i.e., perpendicularly to the pixel column direction), then source bus lines, extending along the pixel columns on the active-matrix substrate, will overlap with the respective color filters. As a result, some of the color filters cannot be used for display purposes anymore.

In a color filter substrate including color filters with an appropriately adjusted area ratio, the ratio of the areas of color filters in the three different colors is adjusted by changing the shorter side length (i.e., the width or the length as measured in the row direction) of striped color filters in one color from that of color filters in another color (see FIG. 1 of Japanese Laid-Open Publication No. 11-174430, for example). However, if the misalignment described above happened while such a color filter substrate and an active-matrix substrate are being bonded together, then the percentage of the shielded area of a color filter in one color, which has overlapped with the source bus line, to the overall area thereof would be different from that of the shielded area of a color filter in another color to the overall area thereof. The shielded area percentage should change because the color filters of the three types have mutually different areas. For example, the color filters having the smallest area of the three types should have the highest shielded area percentage.

Accordingly, even if the ratio of the areas of color filters in the three different colors has been appropriately adjusted so as to achieve desired white chromaticity, the misalignment would make the actual ratio of color filter areas contributing to a substantive display operation different from the desired one, thus increasing or decreasing the actual white chromaticity from the desired one.

To prevent the actual color filter area ratio from shifting from the desired one even in case of such misalignment, the light shielding portions may have an increased width according to a proposed method. However, such a method is not preferred because the effective pixel area ratio (i.e., the aperture ratio) would decrease in that case.

For the sake of simplicity, the problems of the prior art have been described as to a liquid crystal display device including striped color filters. Actually, though, those problems may arise not only in the display device described above but also in any other type of display device in which the misalignment of a color filter substrate from the other substrate affects the pixel aperture ratio.

SUMMARY OF THE INVENTION

In order to overcome the problems described above, preferred embodiments of the present invention provide a color filter substrate, in which each set of color filters in multiple different colors have mutually different areas but which can still minimize the unwanted deterioration in display quality even in case of misalignment, and also provide a display device including such a color filter substrate.

A color filter substrate according to a preferred embodiment of the present invention is preferably used in a display device including pixels that are arranged in a matrix so as to define columns of pixels in a column direction and rows of pixels in a row direction, respectively. The color filter substrate preferably includes a plurality of color filters, each of which is associated with one of the pixels and which include at least two A-color filters in a first color and at least two B-color filters in a second color. Each row of pixels is preferably associated with a group of color filters including at least one of the A-color filters and at least one of the B-color filters. Each A-color filter preferably has a first side and a second side that define its width in the row direction, and each B-color filter preferably also has a first side and a second side that define its width in the row direction. The area SA of each A-color filter is preferably greater than the area SB of each B-color filter. The first side of each of said B-color filters has at least one first-type recess. The at least one first-type recess is formed so as to extend from the first side toward the second side thereof in the row direction. The first side of each of said B-color filters is substantially the same as the first side of each of said A-color filters except that the at least one first-type recess is formed thereon. In other words, the first side of each B-color filter preferably has at least one first-type recess, and the first side of each B-color filter has a shape that is defined by forming a recess on the first side of each A-color filter toward the second side thereof in the row direction.

In one preferred embodiment of the present invention, the sum MB1 of the lengths of the at least one first-type recess of each B-color filter as measured in the column direction is preferably substantially constant in the row direction.

In another preferred embodiment, supposing a +x direction is defined as extending from the second side toward the first side of each A-color filter in the row direction, LA1 is the total length of at least a portion of the first side of each A-color filter at the end of the +x direction, and MB1 is the sum of the lengths of the at least one first-type recess of each B-color filter as measured in the column direction, the color filter substrate preferably satisfies the equation MB1/LA1=(SA−SB)/SA.

In still another preferred embodiment, the width of the at least one first-type recess in the row direction is preferably equal to or greater than an alignment margin in the row direction.

In yet another preferred embodiment, the second side of each B-color filter preferably has at least one second-type recess, and the second side of each B-color filter has a shape that is defined by forming a recess on the second side of each A-color filter toward the first side thereof in the row direction.

In this particular preferred embodiment, the sum MB2 of the lengths of the at least one second-type recess of each B-color filter as measured in the column direction is preferably substantially constant in the row direction.

Alternatively, supposing a −x direction is defined as extending from the first side toward the second side of each A-color filter in the row direction, LA2 is the total length of at least a portion of the second side of each A-color filter at the end of the −x direction, and MB2 is the sum of the lengths of the at least one second-type recess of each B-color filter as measured in the column direction, the color filter substrate preferably satisfies the equation MB2/LA2=(SA−SB)/SA.

As another alternative, the width of the at least one second-type recess in the row direction may be equal to or greater than an alignment margin in the row direction.

In yet another preferred embodiment, the color filters may further include at least two C-color filters in a third color, which is different from the first color of the A-color filters or the second color of the B-color filters. In that case, each row of pixels is preferably associated with a group of color filters including not only at least one of the A-color filters and at least one of the B-color filters but also at least one of the C-color filters. Each C-color filter preferably has a first side and a second side that define its width in the row direction. The area SA of each A-color filter, the area SB of each B-color filter and the area SC of each C-color filter preferably satisfy the inequalities SA>SB and SA>SC. The first side of each C-color filter preferably has at least one third-type recess, and the first side of each C-color filter has a shape that is defined by forming a recess on the first side of each A-color filter toward the second side thereof in the row direction.

In this particular preferred embodiment, the sum MC1 of the lengths of the at least one third-type recess of each C-color filter as measured in the column direction is preferably substantially constant in the row direction.

Alternatively, supposing a +x direction is defined as extending from the second side toward the first side of each A-color filter in the row direction, LA1 is the total length of at least a portion of the first side of each A-color filter at the end of the +x direction, and MC1 is the sum of the lengths of the at least one third-type recess of each C-color filter as measured in the column direction, the color filter substrate preferably satisfies the equation MC1/LA1=(SA−SC)/SA.

In still another preferred embodiment, the width of the at least one third-type recess in the row direction is preferably equal to or greater than an alignment margin in the row direction.

In yet another preferred embodiment, the color filters may further include at least two D-color filters in a fourth color, which is different from the first color of the A-color filters, the second color of the B-color filters or the third color of the C-color filters. In that case, each row of pixels is preferably associated with a group of color filters including not only at least one of the A-color filters, at least one of the B-color filters and at least one of the C-color filters but also at least one of the D-color filters. Each D-color filter preferably has a first side and a second side that define its width in the row direction. The area SA of each A-color filter, the area SB of each B-color filter, the area SC of each C-color filter and the area SD of each D-color filter preferably satisfy the inequalities SA>SB, SA>SC and SA>SD. The first side of each D-color filter preferably has at least one fourth-type recess, and the first side of each D-color filter preferably has a shape that is defined by forming a recess on the first side of each A-color filter toward the second side thereof in the row direction.

In this particular preferred embodiment, the sum MD1 of the lengths of the at least one fourth-type recess of each D-color filter as measured in the column direction is preferably substantially constant in the row direction.

Alternatively, supposing a +x direction is defined as extending from the second side toward the first side of each A-color filter in the row direction, LA1 is the total length of at least a portion of the first side of each A-color filter at the end of the +x direction, and MD1 is the sum of the lengths of the at least one fourth-type recess of each D-color filter as measured in the column direction, the color filter substrate preferably satisfies the equation MD1/LA1=(SA−SD)/SA.

In still another preferred embodiment, the width of the at least one fourth-type recess in the row direction is preferably equal to or greater than an alignment margin in the row direction.

In yet another preferred embodiment, the rows of pixels preferably include a first row and a second row, which are adjacent to each other in the column direction. One of the A-color filters associated with the first row, another one of the A-color filters associated with the second row, and a linking portion for linking together the A-color filters associated with the first and second rows form a columnar A-color filter.

In this particular preferred embodiment, the columnar A-color filter preferably has a first side and a second side that define its width in the row direction, and preferably has a recess on the second side thereof. The second side of the linking portion is preferably included in a bottom edge of the recess provided for the columnar A-color filter. The length of the recess on the second side of the columnar A-color filter as measured in the column direction is preferably substantially constant in the row direction.

Alternatively, the columnar A-color filter may have a first side and a second side that define its width in the row direction, and may have a recess on each of the first and second sides thereof. In that case, the second side of the linking portion is preferably included in a bottom edge of the recess provided on the second side of the columnar A-color filter. The upper edge of the recess provided on the first side of the columnar A-color filter is preferably leveled in the column direction with the lower edge of the recess provided on the second side of the columnar A-color filter. As measured in the row direction, the width of the recess provided on the first side of the columnar A-color filter is preferably equal to that of the recess provided on the second side thereof. Each of the lengths of the recesses on the first and second sides of the columnar A-color filter as measured in the column direction is preferably substantially constant in the row direction.

In that case, as measured in the column direction, the length of the recess provided on the first side of the columnar A-color filter is preferably equal to or greater than that of the linking portion.

In yet another preferred embodiment, the rows of pixels preferably include the first and second rows that are adjacent to each other in the column direction. The color filters preferably further include a columnar A-color filter, which is defined by one of the B-color filters associated with the first row, another one of the B-color filters associated with the second row, and a linking portion for linking together the B-color filters associated with the first and second rows.

In yet another preferred embodiment, the rows of pixels preferably include the first and second rows that are adjacent to each other in the column direction. One of the C-color filters associated with the first row, another one of the C-color filters associated with the second row, and a linking portion for linking together the C-color filters associated with the first and second rows form a columnar C-color filter.

In yet another preferred embodiment, the rows of pixels preferably include the first and second rows that are adjacent to each other in the column direction. The color filters preferably further include a columnar D-color filter, which is defined by one of the D-color filters associated with the first row, another one of the D-color filters associated with the second row, and a linking portion for linking together the D-color filters associated with the first and second rows.

A color filter substrate according to another preferred embodiment of the present invention is preferably used in a display device including pixels that are arranged in a matrix so as to define columns of pixels in a column direction and rows of pixels in a row direction, respectively. The color filter substrate preferably includes a plurality of color filters, each of which is associated with one of the pixels and which include at least two A-color filters in a first color and at least two B-color filters in a second color. Each row of pixels is preferably associated with a group of color filters including at least one of the A-color filters and at least one of the B-color filters. The area SA of each A-color filter is preferably greater than the area SB of each B-color filter. Each A-color filter preferably has a first side and a second side that define its width in the row direction and a third side and a fourth side that define its length in the column direction. Each B-color filter preferably also has a first side and a second side that define its width in the row direction and a third side and a fourth side that define its length in the column direction. A +x direction is defined as extending from the second side toward the first side of each color filter in the row direction. A +y direction is defined as extending from the fourth side toward the third side of each color filter in the column direction. $L^0_{(B1)}$ is defined as the length of at least a portion of the first side of each B-color filter as measured in the column direction except the length of a recess in the column direction if the recess is provided at the same position for the B-color filter and an adjacent one of the A-color filters. $L^0_{(B2)}$ is defined as the length of at least a portion of the second side of each B-color filter as measured in the column direction except the length of another recess in the column direction if the recess is provided at the same position for the B-color filter and the adjacent A-color filter. $L^0_{(B3)}$ is defined as the width of at least a portion of the third side of each B-color filter as measured in the row direction except the width of a recess in the row direction if the recess is provided at the same position for the B-color filter and the adjacent A-color filter. And $L^0_{(B4)}$ is defined as the width of at least a portion of the fourth side of each B-color filter as measured in the row direction except the width of another recess in the row direction if the recess is provided at the same position for the B-color filter and the adjacent A-color filter. As measured in the column direction, $L_{(B1)}$ is defined as the total length of at least a portion of the first side of each B-color filter at the end of the +x direction, while $L_{(B2)}$ is defined as the total length of at least a portion of the second side of each B-color filter at the end of the −x direction. As measured in the row direction, $L_{(B3)}$ is defined as the total width of at least a portion of the third side of each B-color filter at the end of the +y direction, while $L_{(B4)}$ is defined as the total width of at least a portion of the fourth side of each B-color filter at the end of the −y direction. If at least one of the first, second, third and fourth sides of each B-color filter has a recess, then at least one of the inequalities $L^0_{(B1)} > L_{(B1)}$, $L^0_{(B2)} > L_{(B2)}$, $L^0_{(B3)} > L_{(B3)}$ and $L^0_{(B4)} > L_{(B4)}$ is preferably satisfied.

In one preferred embodiment of the present invention, the first side of each B-color filter may have the recess, the length of the recess in the column direction may be substantially constant in the row direction, and $L_{(B1)}/L_{(A1)} = SB/SA$ may be satisfied.

In another preferred embodiment, the second side of each B-color filter may have the recess, the length of the recess in the column direction may be substantially constant in the row direction, and $L_{(B2)}/L_{(A2)} = SB/SA$ may be satisfied.

In still another preferred embodiment, the third side of each B-color filter may have the recess, the width of the recess in the row direction may be substantially constant in the column direction, and $L_{(B3)}/L_{(A3)} = SB/SA$ may be satisfied.

In yet another preferred embodiment, the fourth side of each B-color filter may have the recess, the width of the recess in the row direction may be substantially constant in the column direction, and $L_{(B4)}/L_{(A4)} = SB/SA$ may be satisfied.

In yet another preferred embodiment, each of the first, second, third and fourth sides of each B-color filter may have the recess and all of the inequalities $L^0{}_{(B1)} > L_{(B1)}$, $L^0{}_{(B2)} > L_{(B2)}$, $L^0{}_{(B3)} > L_{(B3)}$ and $L^0{}_{(B4)} > L_{(B4)}$ may be satisfied.

In yet another preferred embodiment, $L_{(B1)}/L_{(A1)} = L_{(B2)}/L_{(A2)} = L_{(B3)}/L_{(A3)} = L_{(B4)}/L_{(A4)} = SB/SA$ may be satisfied.

In yet another preferred embodiment, the rows of pixels preferably include a first row and a second row, which are adjacent to each other in the column direction. One of the A-color filters associated with the first row, another one of the A-color filters associated with the second row, and a linking portion for linking together the A-color filters associated with the first and second rows form a columnar A-color filter.

In this particular preferred embodiment, the columnar A-color filter preferably has a first side and a second side that define its width in the row direction. The columnar A-color filter preferably has a recess on the second side thereof. The second side of the linking portion is preferably included in a bottom edge of the recess provided for the columnar A-color filter. The length of the recess on the second side of the columnar A-color filter as measured in the column direction is preferably substantially constant in the row direction.

In an alternative preferred embodiment, the columnar A-color filter preferably has a first side and a second side that define its width in the row direction. The columnar A-color filter preferably has a recess on each of the first and second sides thereof. The second side of the linking portion is preferably included in a bottom edge of the recess provided on the second side of the columnar A-color filter. The upper edge of the recess provided on the first side of the columnar A-color filter is preferably leveled in the column direction with the lower edge of the recess provided on the second side of the columnar A-color filter. As measured in the row direction, the width of the recess provided on the first side of the columnar A-color filter is preferably equal to that of the recess provided on the second side thereof. Each of the lengths of the recesses on the first and second sides of the columnar A-color filter as measured in the column direction is preferably substantially constant in the row direction.

In this particular preferred embodiment, as measured in the column direction, the length of the recess provided on the first side of the columnar A-color filter is preferably equal to or greater than that of the linking portion.

A display device according to a preferred embodiment of the present invention preferably includes the color filter substrate according to any of the preferred embodiments of the present invention described above.

Various preferred embodiments of the present invention provide a color filter substrate, which minimizes the deterioration in the display quality of a color display device, and also provide a display device including such a color filter substrate. That is to say, according to various preferred embodiments of the present invention, not only the decrease in pixel aperture ratio but also the deterioration of desired color balance (i.e., decrease in white chromaticity) due to some misalignment can be minimized.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 7A through 7F are cross-sectional views showing respective process steps for fabricating the color filter substrate shown in FIG. 1.

DETAILED DESCRIPTION OF PREFERRED EMBODIMENTS

Figure 15:
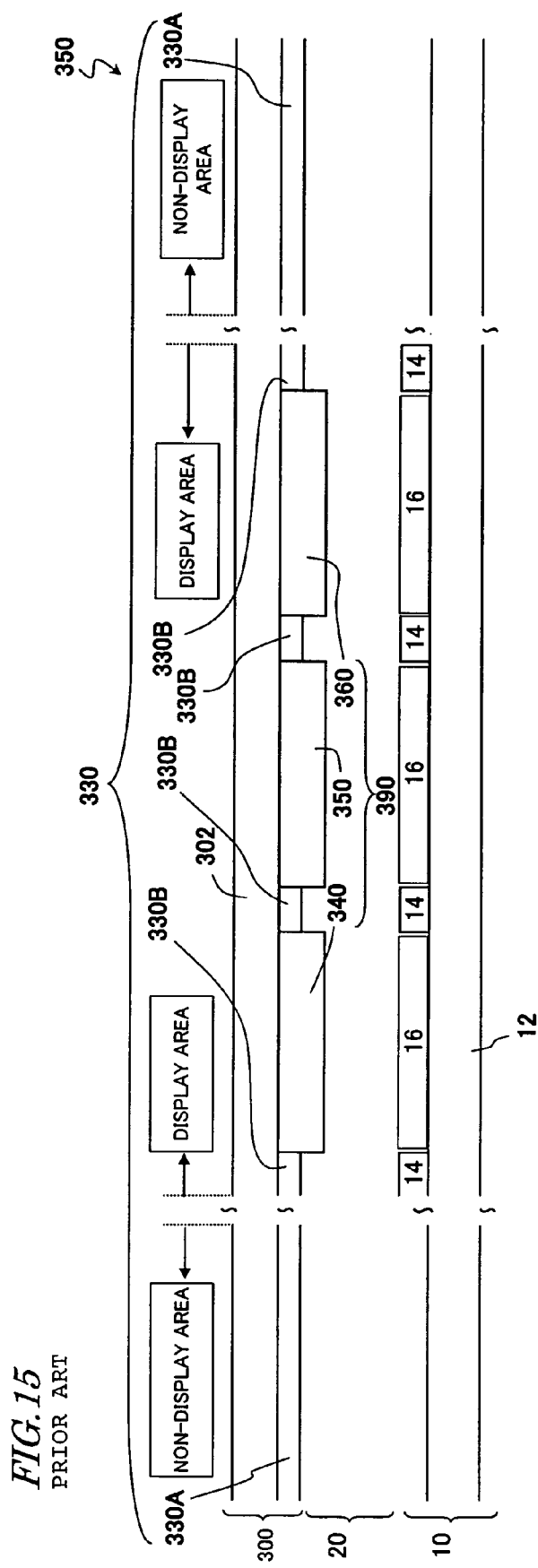
FIG. 15 is a cross-sectional view illustrating a normal active-matrix-addressed liquid crystal display device.

Hereinafter, color filter substrates according to various preferred embodiments of the present invention will be described with reference to the accompanying drawings. A color filter substrate according to any of various preferred embodiments of the present invention is preferably used in a display device including pixels that are arranged in a matrix so as to define columns of pixels in a column direction and rows of pixels in a row direction, respectively. Also, in a color filter substrate according to every preferred embodiment of the present invention, the areas of its color filters are adjusted on a color-by-color basis. That is to say, the area of a color filter in one color is different from that of a color filter in another color. In the following preferred embodiments, the present invention will be described as being applied to a color filter substrate including color filters that are preferably arranged in stripes for use in an active-matrix-addressed liquid crystal display device (see FIG. 15). However, the present invention is in no way limited to such specific preferred embodiments.

It should be noted that a "color filter" will refer to herein a portion of the color filter substrate, which is provided so as to be associated with one of multiple pixels. Color filters arranged in stripes include multiple groups of color filters, each including multiple color filters that are associated with either a column of pixels or a row of pixels. A group of color filters of the former type will be sometimes referred to herein as a "column of color filters", while a group of color filters of the latter type will be sometimes referred to herein as a "row of color filters". A column of color filters includes a number of color filters in the same color. The column of color filters typically constitutes a striped "columnar color filter" with linking portions to be shielded with a gate bus line. That is, a columnar color filter includes a column of color filters and linking portions which links two color filters that are adjacent to each other in the column direction. Meanwhile, a row of color filters is an alternate and cyclic arrangement of color filters in multiple different colors (e.g., including red (R), green (G) and blue (B) color filters in this order) and also includes an light shielding portion (i.e., a portion of a black matrix) between each adjacent pair of color filters. Furthermore, a layer defined by all of these color filters (i.e., all of those columnar color filters) will be sometimes referred to herein as a "color filter layer".

Figure 1:
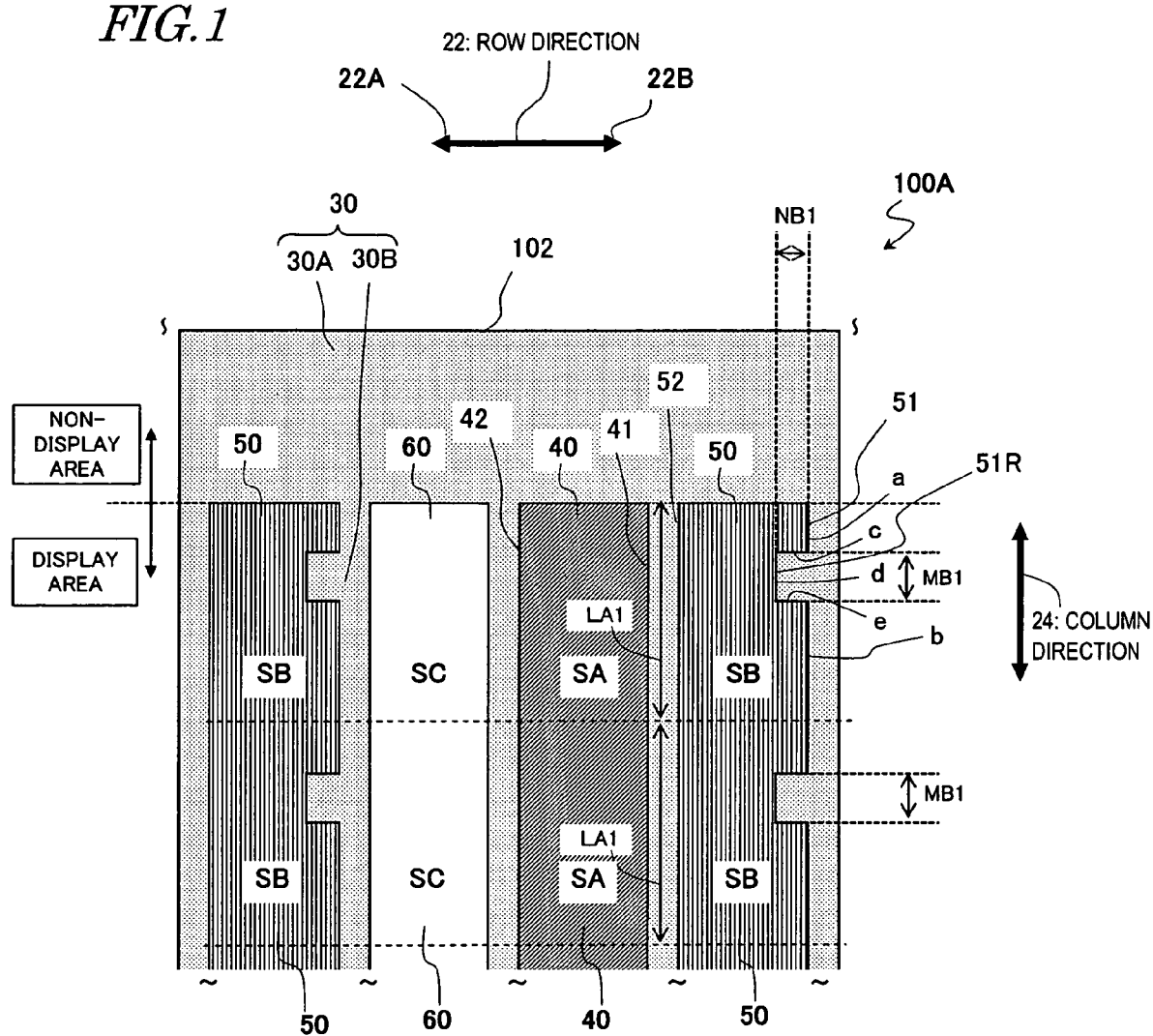
FIG. 1 is a plan view illustrating a color filter substrate according to a specific preferred embodiment of the present invention.

FIG. 1 is a plan view illustrating a color filter substrate 100A according to a specific preferred embodiment of the present invention.

The color filter substrate 100A preferably includes multiple color filters 40, 50 and 60 and a light shielding layer 30 on a substrate 102 made of glass, for example. The color filters are preferably arranged in a matrix (i.e., in columns and rows) such that each of the color filters is associated with one of a plurality of pixels. All of these color filters are preferably provided within a display area so as to define the colors in which their associated pixels are displayed. The light shielding layer 30 preferably includes light shielding portions 30A, which are provided in the non-display area (i.e., in the picture frame area), and light shielding portions 30B, which are provided in the display area. The gap between two adjacent color filters is preferably shielded with one of the light shielding portions 30B.

In the matrix arrangement of color filters shown in FIG. 1, each group of color filters, which is associated with one of the rows of pixels, preferably includes an A-color filter 40, a B-color filter 50 and a C-color filter 60, which preferably define three different colors. For example, each of the A-color, B-color and C-color filters 40, 50 and 60 may be a red color filter, a green color filter or a blue color filter. In this preferred embodiment, among the multiple color filters included in the color filter substrate 100A, the A-color filters 40 preferably have the largest area and the B-color filters 50 preferably have the smallest area. Supposing the areas of the A-color, B-color and C-color filters 40, 50 and 60 are identified by SA, SB and SC, respectively, SC=SA>SB is satisfied, for example. Each of the A-color filters 40 has a first side 41 and a second side 42 that define its width in the row direction 22. In the same way, each of the B-color filters 50 also has a first side 51 and a second side 52 that define its width in the row direction 22. It should be noted that if the first or second side has a recess and includes a plurality of segments, the first or second side includes all of those segments. For example, the first side 51 of the B-color filter 50 shown in FIG. 1 includes two segments a and b with no recesses and three segments c, d and e that define a recess 51R.

The color filter substrate 100A of this preferred embodiment is characterized in that the first side 51 of each B-color filter 50, having the smallest area, has at least one first-type recess 51R formed thereon. The first side 51 of each B-color filter 50 has a shape that is substantially the same as the first side 41 of each A-color filter 40, which has the largest area, except that at least one first-type recess 51R is formed in the first side 51 of each B-color filter 50 so as to extend from the first side 51 toward the second side 52 thereof in the row direction 22. That is, the only difference between the first side 51 of the B-color filter 50 and the first side 41 of the A-color filter is the presence of the at least one first-type recess 51R which is provided to achieve a desired adjustment of the area ratio of the color filters. In other words, the color filter substrate 100A of this preferred embodiment is characterized in that the first side 51 of each B-color filter 50, having the smallest area, has at least one first-type recess 51R, and the first side 51 of each B-color filter 50 has a shape that is defined by forming a recess on the first side 41 of each A-color filter 40, having the largest area, toward the second side 42 thereof in the row direction 22.

As described above, an active-matrix substrate to be bonded with this color filter substrate 100A includes multiple source bus lines extending along the columns of pixels (which will be referred to herein as a "column direction 24"). Each of those source bus lines is arranged so as to face the gap between two columns of color filters that are adjacent to each other in the pixel row direction 22 and is preferably shielded with one of the light shielding portions 30B of the color filter substrate 100A.

In this color filter substrate 10A, the first side 51 of the B-color filter 50, which has the smallest area among the three types of color filters 40, 50 and 60, includes the first-type recess 51R. Accordingly, even if the active-matrix substrate bonded has shifted in the pixel row direction indicated by the arrow 22A (i.e., from the first side 51 of the color filter toward the second side 52 thereof) with respect to the color filter substrate 10A, the ratio of the area of a portion of the A-color filter 40, shielded with a source bus line on the active-matrix substrate, to that of a portion of the B-color filter 50, shielded with the same source bus line, can be closer to the ratio of the area SA of the A-color filter 40 to the area SB of the B-color filter 50. That is to say, even in case of such misalignment, the ratio of the non-shielded effective area of the A-color filter 40 to that of the B-color filter 50 can be close to the ratio of the overall area SA of the A-color filter 40 to the overall area SB of the B-color filter 50. Consequently, even if the active-matrix substrate bonded has shifted with respect to a color filter substrate in which the ratio of the areas of multiple types of color filters is adjusted so as to achieve desired white chromaticity (i.e., the areas of color filters change on a color-by-color basis), the variation of the white chromaticity from its desired value can be minimized.

Also, in this preferred embodiment, the light shielding portion 30B to be provided between two adjacent color filters does not have to have a broad width, and therefore, the decrease in effective pixel area ratio (i.e., aperture ratio) is avoidable, too.

In the example illustrated in FIG. 1, the first-type recess 51R has a substantially rectangular shape, of which the length MB1 in the column direction 24 is substantially constant in the row direction 22. However, the first-type recess 51R does not have to be substantially rectangular but may also have such a shape as having variable lengths MB1 in the row direction 22.

In the example illustrated in FIG. 1, the first side 51 of each B-color filter 50 (associated with a single pixel) includes just one first-type recess 51R. Alternatively, in a color filter substrate 100A according to another preferred embodiment of the present invention, the first side 51 of each B-color filter 50 may include a plurality of first-type recesses 51R.

In a preferred embodiment, the sum MB1 of the lengths of the at least one first-type recess 51R of each B-color filter 50 as measured in the column direction is preferably substantially constant in the row direction 22. It should be noted that if the first side 51 of a B-color filter 50 includes just one first-type recess 51R, then the sum MB1 of the lengths of the at least one first-type recess 51R as measured in the column direction is the length of the only first-type recess 51R in the column direction. On the other hand, if the first side 51 of a B-color filter 50 includes a plurality of first-type recesses 51R, then the sum MB1 of the lengths of the at least one first-type recess 51R as measured in the column direction is the sum of the lengths of those first-type recesses 51R in the column direction.

No matter what shape the first-type recesses 51R have, the first-type recesses 51R are preferably arranged as described above. In that case, if the active-matrix substrate has shifted with respect to the color filter substrate 100A in the row direction 22 by at most the width of the first-type recess 51R in the row direction 22, then the area of the effective portion of the B-color filter 50, contributing to a display operation, will decrease proportionally to the shift width. Accordingly, as long as the shift width is substantially equal to or smaller than the width of the first-type recess 51R in the row direction 22, the ratio of the effective area of the A-color filter 40 to that of the B-color filter 50 can be closer to the ratio of the overall area SA of the A-color filter 40 to the overall area SB of the B-color filter 50. For example, the first-type recess 51R preferably has a substantially rectangular shape in which its length in the column direction remains MB1 through the width NB1 in the row direction as shown in FIG. 1. Consequently, if the active-matrix substrate has shifted with respect to the color filter substrate 100A in the row direction 22 by at most NB1 in the row direction 22, the ratio of the effective area of the A-color filter 40 to that of the B-color filter 50 is approximately equal to the ratio of the overall area SA of the A-color filter 40 to the overall area SB of the B-color filter 50.

In a preferred embodiment, supposing the +x direction 22B is defined as extending from the second side 42 toward the first side 41 of each A-color filter 40 in the row direction 22, LA1 is the total length of at least a portion of the first side 41 of each A-color filter 40 at the end of the +x direction, LB1 is the total length of at least a portion of the first side 51 of each B-color filter 50 at the end of the +x direction (LB1 is the sum of the lengths of the segments a and b in FIG. 1), and MB1 is the sum of the lengths of the at least one first-type recess 51R of each B-color filter 50 as measured in the column direction 24, the color filter substrate preferably satisfies the equations MB1/LA1=(SA−SB)/SA and LA1=LB1+MB1.

It should be noted that the length of at least a portion of the first side 41 of each A-color filter 40 extending in the y (or column) direction 24 (i.e., $L^0_{(A1)}$ to be described later) is substantially equal to that of the first side 51 of each B-color filter 50 extending in the y (or column) direction 24 (i.e., $L^0_{(B1)}$ to be described later). Also, LA1 and LB1 are respectively equal to $L_{(A1)}$ and $L_{(B1)}$ to be described later.

The first-type recesses 51R are preferably arranged as described above. In that case, if the active-matrix substrate has shifted with respect to the color filter substrate 100A in the row direction 22 by at most the width NB1 of the first-type recess 51R in the row direction 22, then the ratio of the effective area of the A-color filter 40 to that of the B-color filter 50 can be approximately equal to the ratio of the overall area SA of the A-color filter 40 to the overall area SB of the B-color filter 50.

A more specific arrangement of the A-color and B-color filters may be defined in the following manner. First, the ratio of the area of the A-color filter 40 to that of the B-color filter 50 is determined so as to achieve desired white chromaticity. Also, LA1 of the A-color filter 40 is defined according to the size and resolution of the display device, for example. Once the area ratio between the two types of color filters and LA1 are determined in this manner, MB1 can be given by the equation MB1/LA1=(SA−SB)/SA. Accordingly, if the width NB1 of the at least one first-type recess 51R in the row direction is determined, then the width of the B-color filter 50 in the row direction 22 can be obtained. The width NB1 is defined so as to be approximately equal to or greater than the alignment margin in the row direction.

Hereinafter, it will be described why the first side 41 of the A-color filter 40 should be compared with the first side 51 of the B-color filter 50 and why the second side 42 of the A-color filter 40 should be compared with the second side 52 of the B-color filter 50. Specifically, if the active-matrix substrate includes switching elements such as TFTs or MIMs (e.g., TFTs in the following example), then the color filter substrate includes light shielding portions (not shown in FIG. 1) that shield the TFTs from light. A TFT light shielding portion is preferably provided at a predetermined position with respect to each pixel and has a constant area. Also, each color filter has a recess with the same area as the TFT light shielding portion at a predetermined location (i.e., either on the first side or on the second side thereof). The shape of the first side is normally different from that of the second side. Accordingly, the first sides of two types of color filters are compared with each other and the second sides thereof are also compared with each other because each of these pairs should be affected by misalignment to the same degree.

In a preferred embodiment, the width of the at least one first-type recess 51R in the row direction is defined to be approximately equal to, or greater than, an alignment margin in the row direction.

As described above, in this preferred embodiment, the areas SA, SB and SC of the A-color, B-color and C-color filters 40, 50 and 60 preferably satisfy SC=SA>SB and the B-color filter 50 has the smallest area. For example, if red, green and blue color filters are used as the A-color, B-color and C-color filters 40, 50 and 60, then the specific colors of the A-color, B-color and C-color filters 40, 50 and 60 are appropriately determined according to the desired white chromaticity. In a preferred embodiment, the B-color filter 50 may be a green color filter, the A-color filter 40 may be one of red and blue color filters, and the C-color filter 60 may be the other of red and blue color filters.

It should be noted that the first-type recess 51R of the B-color filter 50 may have its width NB1 in the row direction equalized with the width of the B-color filter 50 itself in the row direction. That is to say, the B-color filter 50 may be divided into two by the first-type recess 51R in the column direction. In that case, the A-color, B-color and C-color filters may have an equal width in the row direction, and therefore, the color filters and pixel electrodes can be designed easily.

Hereinafter, an exemplary color filter substrate 100A according to this preferred embodiment will be described in further detail by reference to a comparative example.

For example, the color filter substrate 100A may include red color filters (as the A-color filters 40), green color filters (as the B-color filters 50) and blue color filters (as the C-color filters 60) and the ratio of the areas SA, SB and SC of the red, green, and blue color filters may preferably be, for example, about 1.03 to about 0.95 to about 1.03. Each of these color filters 40, 50 and 60 may preferably have a length of, for example, approximately 250 μm (which is substantially equal to the length of a single pixel) in the column direction 24.

The first side 51 of the green color filter 50, having the smallest area, includes a first-type recess. The first side 51 of the green color filter 50 has a shape that is defined by forming a recess on the first side 41 of the red color filter 40 (or that of the blue color filter 60) toward the second side 42 thereof in the row direction. Supposing LA1 is the total length of at least a portion of the first side 41 of each red filter 40 at the end of the +x direction (i.e., extending from the second side 42 toward the first side 41 of the red filter 40) and MB1 is the length of the first-type recess 51R in the column direction 24, the first-type recess 51R is preferably provided so as to satisfy the equation MB1/LA1=(SA−SB)/SA. Accordingly, the length MB1 of the first-type recess 51R in the column direction 24 is preferably, for example, about 19.5 μm. Since the alignment margin is about 5 μm, for example, the width NB1 of the first-type recess 51R in the row direction is preferably about 5.5 μm, for example. Also, when the red and blue color filters 40 and 60 have a width of about 89 μm in the row direction, for example, the green color filter 50 may have a width of about 82.5 μm in the row direction.

In the color filter substrate 100A, even if a misalignment of about 5 μm has occurred in the direction 22A extending from the first side 51 of the color filter toward the second side 52 thereof, the ratio of the substantive effective display areas of the red, green and blue color filters can be substantially maintained at the SA:SB:SC ratio described above. The following Table 1 shows the chromaticity coordinates (x, y, Y) of the red, green and blue color filters 40, 50 and 60. On the other hand, the following Table 2 shows the chromaticity coordinates thereof in a situation where no misalignment occurred and the chromaticity coordinates thereof in a situation where a misalignment of about 5 μm occurred:

TABLE 1

|  | Chromaticity (x, y, Y) |
| --- | --- |
| Red | (0.644, 0.346, 6.11) |
| Green | (0.280, 0.601, 16.84) |
| Blue | (0.141, 0.083, 2.79) |

TABLE 2

|  | Chromaticity (x, y, Y) |
| --- | --- |
| No misalignment occurred | (0.302, 0.330, 25.75) |
| Misalignment of 5 μm occurred | (0.302, 0.330, 25.61) |

As can be seen from Table 2, the color filter substrate 100A of this preferred embodiment showed substantially constant white chromaticity even in case of misalignment. The parameters shown in Table 1 are only illustrative ones and the present invention is in no way limited to these specific values.

Figure 2:
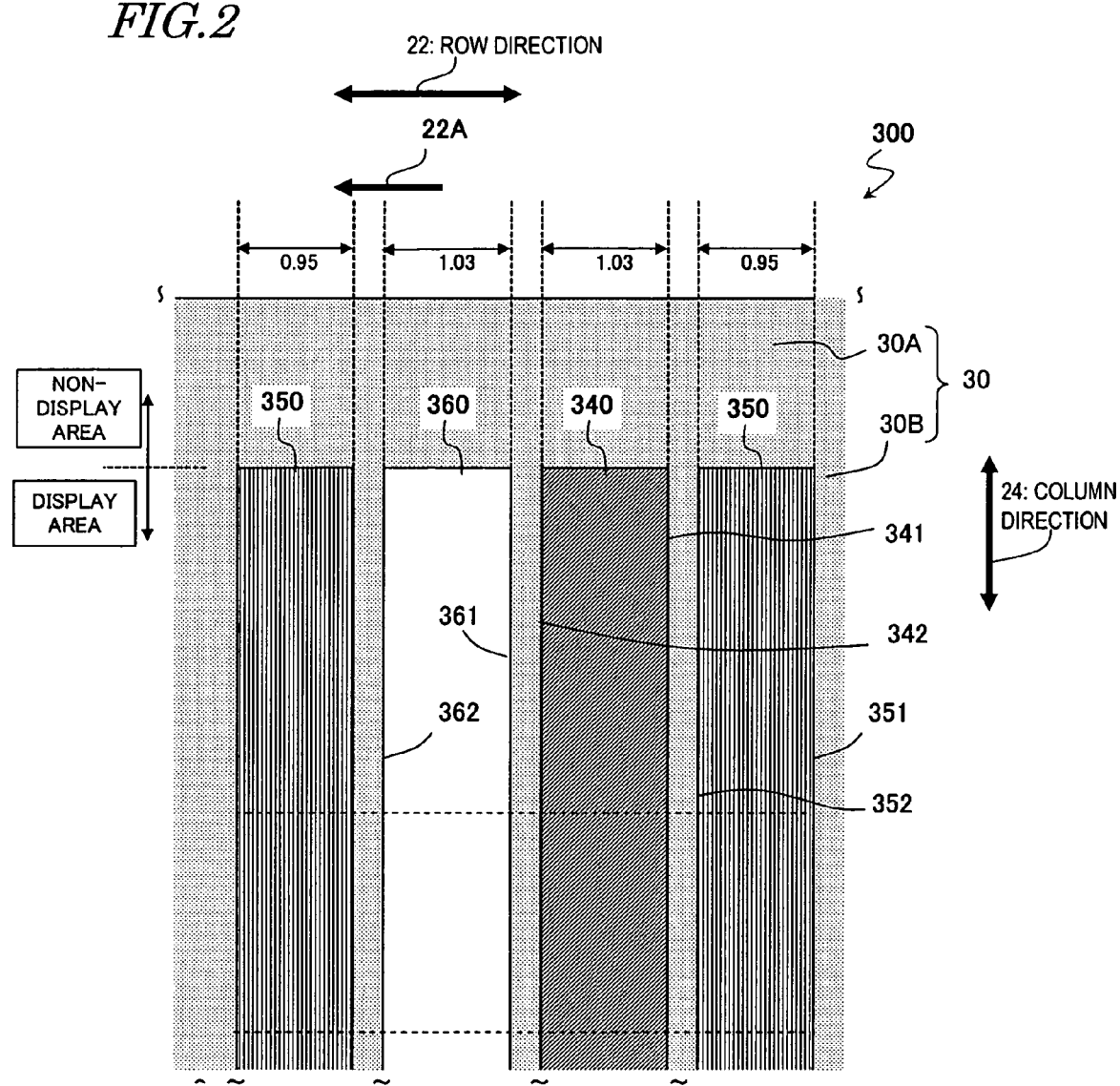
FIG. 2 is a plan view illustrating a color filter substrate according to a comparative example.
Figure 3:
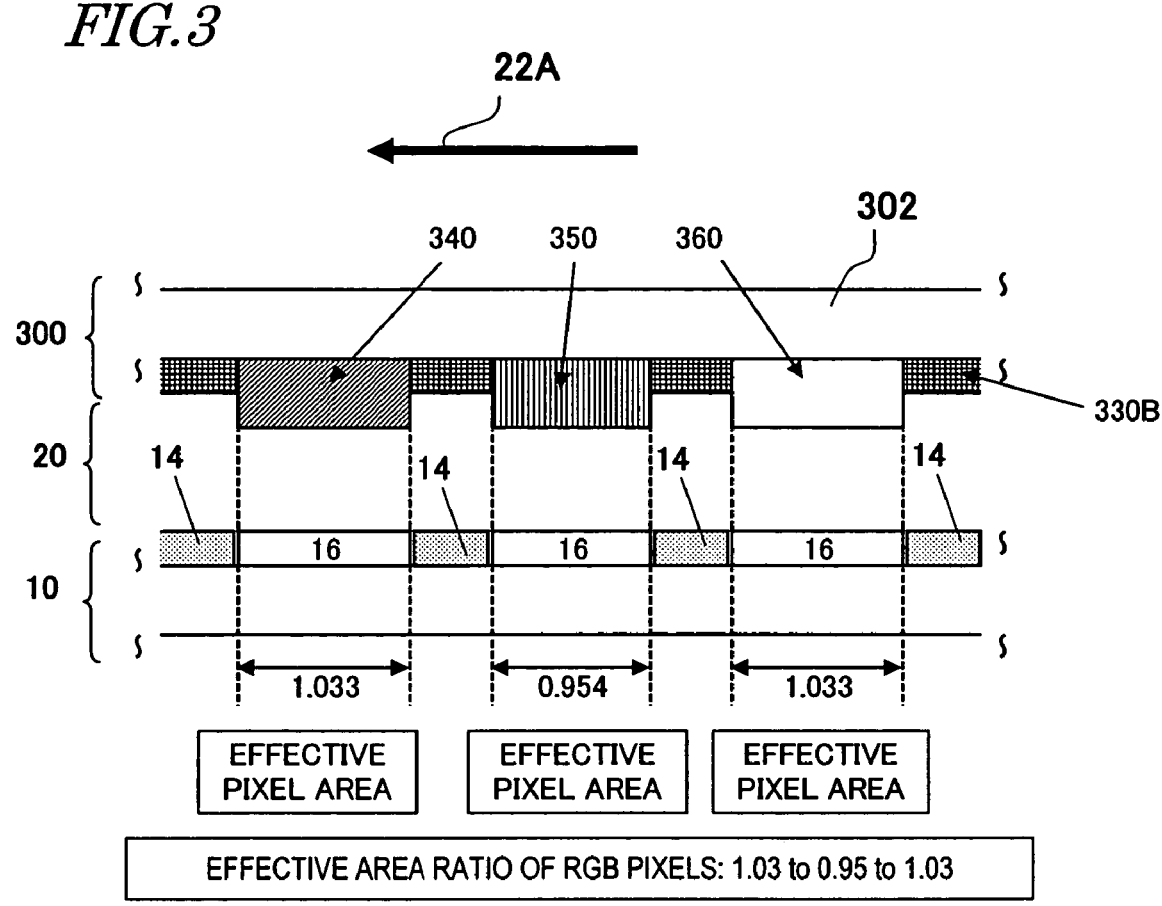
FIG. 3 is a cross-sectional view of the color filter substrate of the comparative example in which no misalignment has occurred.

FIGS. 2 and 3 are respectively a plan view and a cross-sectional view illustrating a color filter substrate 300 according to a comparative example. Unlike the color filter substrate 100A of the preferred embodiment described above, no color filter of the color filter substrate 300 of this comparative example includes any recess, and the ratio of the areas of red, green and blue color filters 340, 350 and 360 is adjusted by changing the widths of the respective color filters (i.e., the width of the gap between the first and second sides 341 and 342 of the red color filter 340, the width of the gap between the first and second sides 351 and 352 of the blue color filter 350, and the width of the gap between the first and second sides 361 and 362 of the blue color filter 360). More specifically, in this comparative example, the ratio of the areas SA, SB and SC of the red, green and blue color filters 340, 350 and 360 is about 1.03:about 0.95:about 1.03, which is substantially equal to the ratio of the widths of the red, green and blue color filters 340, 350 and 360.

Figure 4:
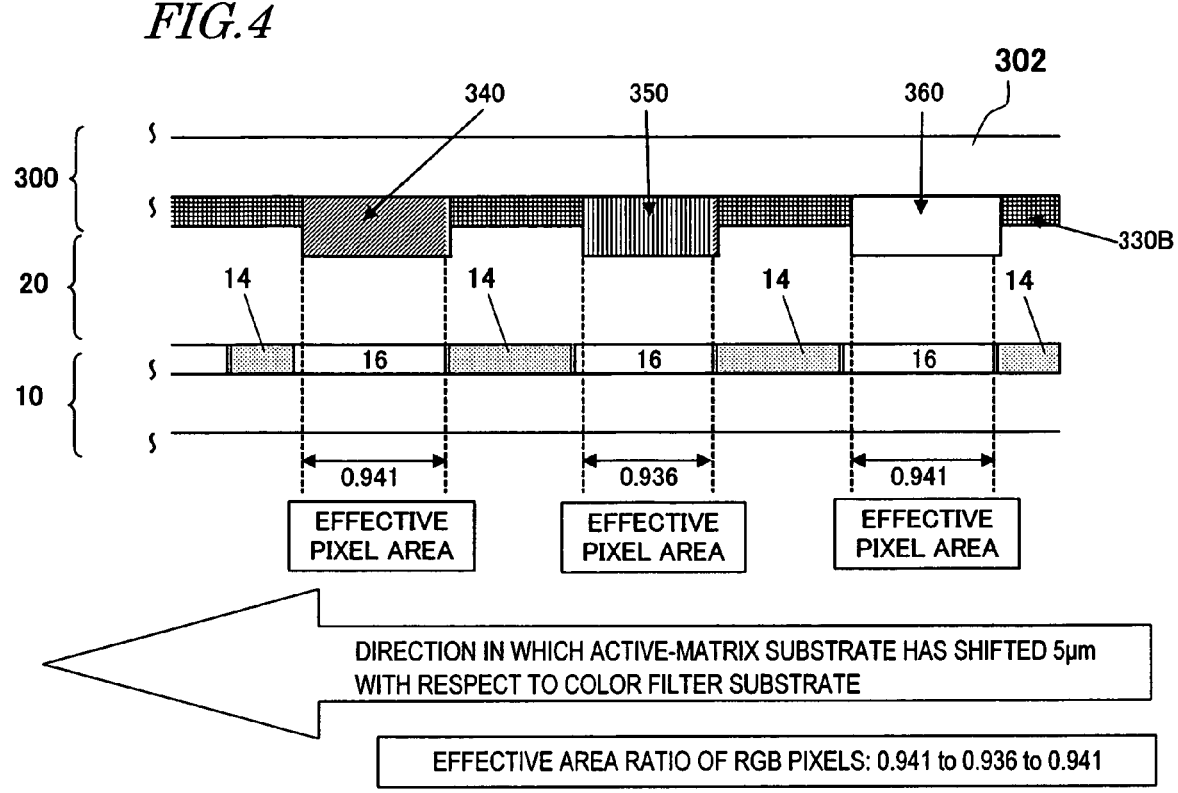
FIG. 4 is a cross-sectional view of the color filter substrate of the comparative example in which some misalignment has occurred.

FIG. 4 schematically illustrates a situation where a misalignment of about 5 μm occurred in the direction extending from the first side 341 of the color filter toward the second side thereof when the color filter substrate 300 of the comparative example was bonded to an active-matrix substrate 10.

As shown in FIG. 4, in that case, each of the color filters 340, 350 and 360 is partially shielded with a source bus line 14, and therefore, the ratio of the substantive effective display areas of the red, green and blue color filters changes into about 0.941:about 0.936:about 0.941, which is different from the SA:SB:SC ratio described above. The following Table 3 shows the white display chromaticity coordinates (x, y, Y) in a situation with no misalignment and in a situation with a misalignment of about 5 μm:

TABLE 3

|  | Chromaticity (x, y, Y) |
| --- | --- |
| No misalignment occurred | (0.302, 0.330, 25.75) |
| Misalignment of 5 μm occurred | (0.303, 0.325, 24.15) |

As can be seen from Table 3, when the misalignment occurred, the white chromaticity changed.

Hereinafter, a color filter substrate according to another specific preferred embodiment of the present invention will be described with reference to FIG. 5.

Figure 5:
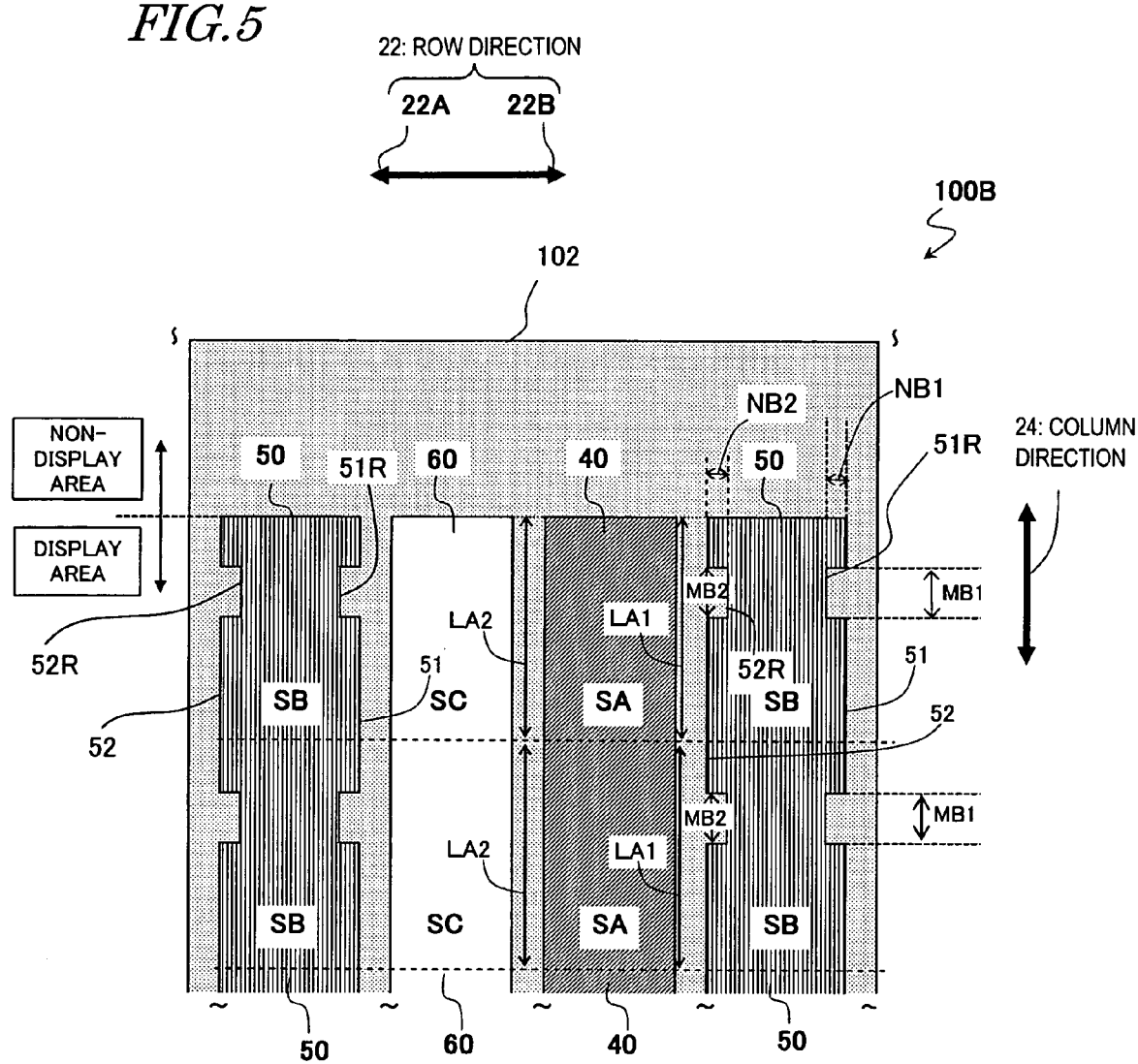
FIG. 5 is a plan view illustrating a color filter substrate according to a modified example of the preferred embodiment shown in FIG. 1.

As shown in FIG. 5, in a color filter substrate 100B according to another preferred embodiment of the present invention, the B-color filter 50 having the smallest area preferably includes a first-type recess 51R on the first side 51 thereof and a second-type recess 52R on the second side 52 thereof, respectively. The areas SA, SB and SC of the A-color, B-color and C-color filters 40, 50 and 60 preferably satisfy SC=SA>SB.

The first side 51 of the B-color filter 50 preferably includes at least one first-type recess, and the first side 51 of the B-color filter 50 preferably has a shape that is substantially the same as the first side 41 of each A-color filter 40, except that a recess 51R is formed in the first side 51 of each B-color filter 50 so as to extend from the first side 51 toward the second side 52 thereof in the row direction 22A. That is, the only difference between the first side 51 of the B-color filter 50 and the first side 41 of the A-color filter is the presence of the first-type recess 51R which is provided to achieve a desired adjustment of the area ratio of the color filters. On the other hand, the second side 52 of the B-color filter 50 preferably includes at least one second-type recess 52R, and the second side 52 of the B-color filter 50 preferably has a shape that is substantially the same as the second side 42 of each A-color filter 40, except that at least one second-type recess 52R is formed in the second side 52 of each B-color filter 50 so as to extend from the second side 52 toward the first side 51 thereof in the row direction 22B.

If the B-color filter 50 having the smallest area includes recesses both on the first and second sides 51 and 52 thereof as in this color filter substrate 100B, then the variation in white chromaticity from the desired value can be minimized no matter whether misalignment has occurred in the direction 22A extending from the first side 51 of the B-color filter 50 toward the second side 52 thereof or in the direction 22B extending from the second side 52 of the B-color filter 50 toward the first side 51 thereof.

In the example illustrated in FIG. 5, the first and second sides 51 and 52 of each B-color filter 50 (associated with a single pixel) each preferably includes just one recess 51R or 52R. Alternatively, in a color filter substrate 100B according to another preferred embodiment of the present invention, the first and second sides 51 and 52 of each B-color filter 50 may each include a plurality of recesses 51R or 52R.

Just like the first-type recess 51R described above, the second-type recess 52R of the second side 52 is preferably also defined such that the sum MB2 of the lengths thereof as measured in the column direction 24 is substantially constant in the row direction.

As described above, the first-type recess 51R preferably satisfies MB1/LA1=(SA−SB)/SA. Supposing LA2 is the total length of at least a portion of the second side 42 of each A-color filter 40 at the end of the −x direction 22A, LB2 is the total length of at least a portion of the second side 52 of each B-color filter 50 at the end of the −x direction, and MB2 is the sum of the lengths of the at least one second-type recess 52R of each B-color filter 50 as measured in the column direction 24, the color filter substrate preferably satisfies the equations MB2/LA2=(SA−SB)/SA and LA2=LB2+MB2.

It should be noted that the length of at least a portion of the first side 41 of each A-color filter 40 extending in the y direction 24 (i.e., $L^0_{(A1)}$ to be described later) is substantially equal to that of the first side 51 of each B-color filter 50 extending in the y direction 24 (i.e., $L^0_{(B1)}$ to be described later). In the same way, the length of at least a portion of the second side 42 of each A-color filter 40 extending in the y direction 24 (i.e., $L^0_{(A2)}$ to be described later) is substantially equal to that of the second side 52 of each B-color filter 50 extending in the y direction 24 (i.e., $L^0_{(B2)}$ to be described later). Also, LA1 and LA2 are respectively equal to $L_{(A1)}$ and $L_{(A2)}$ to be described later, and LB1 and LB2 are respectively equal to $L_{(B1)}$ and $L_{(B2)}$ to be described later.

The width NB1 of the at least one first-type recess 51R in the row direction and the width NB2 of the at least one second-type recess 52R in the row direction are preferably each defined so as to be approximately equal to, or greater than, the alignment margin in the row direction.

Hereinafter, a color filter substrate 100C according to another preferred embodiment of the present invention will be described with reference to FIG. 6.

In this color filter substrate 100C, the areas SA, SB and SC of the A-color, B-color and C-color filters 40, 50 and 60 preferably satisfy the inequalities SA>SB and SA>SC (e.g., SA>SB>SC), and each of the B-color and C-color filters 50 and 60, having a smaller area than the A-color filter 40, preferably includes at least one recess 51R or 61R. That is to say, the first side 51 of the B-color filter 50 preferably includes at least one first-type recess 51R, and the first side 51 of the B-color filter 50 has a shape that is substantially the same as the first side 41 of each A-color filter 40, which has the largest area, except that a recess 51R is formed in the first side 51 of each B-color filter 50 so as to extend from the first side 51 toward the second side 52 thereof in the row direction 22A. That is, the only difference between the first side 51 of the B-color filter 50 and the first side 41 of the A-color filter is the presence of the first-type recess 51R which is provided to achieve a desired adjustment of the area ratio of the color filters. In addition, the first side 61 of the C-color filter 60 includes at least one third-type recess 61R, and the first side 61 of the C-color filter 60 has a shape that is substantially the same as the first side 41 of each A-color filter 40, except that at least one third-type recess 61R is formed in the first side 61 of each C-color filter 60 so as to extend from the first side 61 toward the second side 62 thereof in the row direction 22A. That is, the only difference between the first side 61 of the C-color filter 60 and the first side 41 of the A-color filter is the presence of the at least one third-type recess 61R which is provided to achieve a desired adjustment of the area ratio of the color filters.

In this color filter substrate 100C, even if the A-color, B-color and C-color filters have mutually different areas, the variation in white chromaticity due to misalignment can also be minimized.

Figure 6:
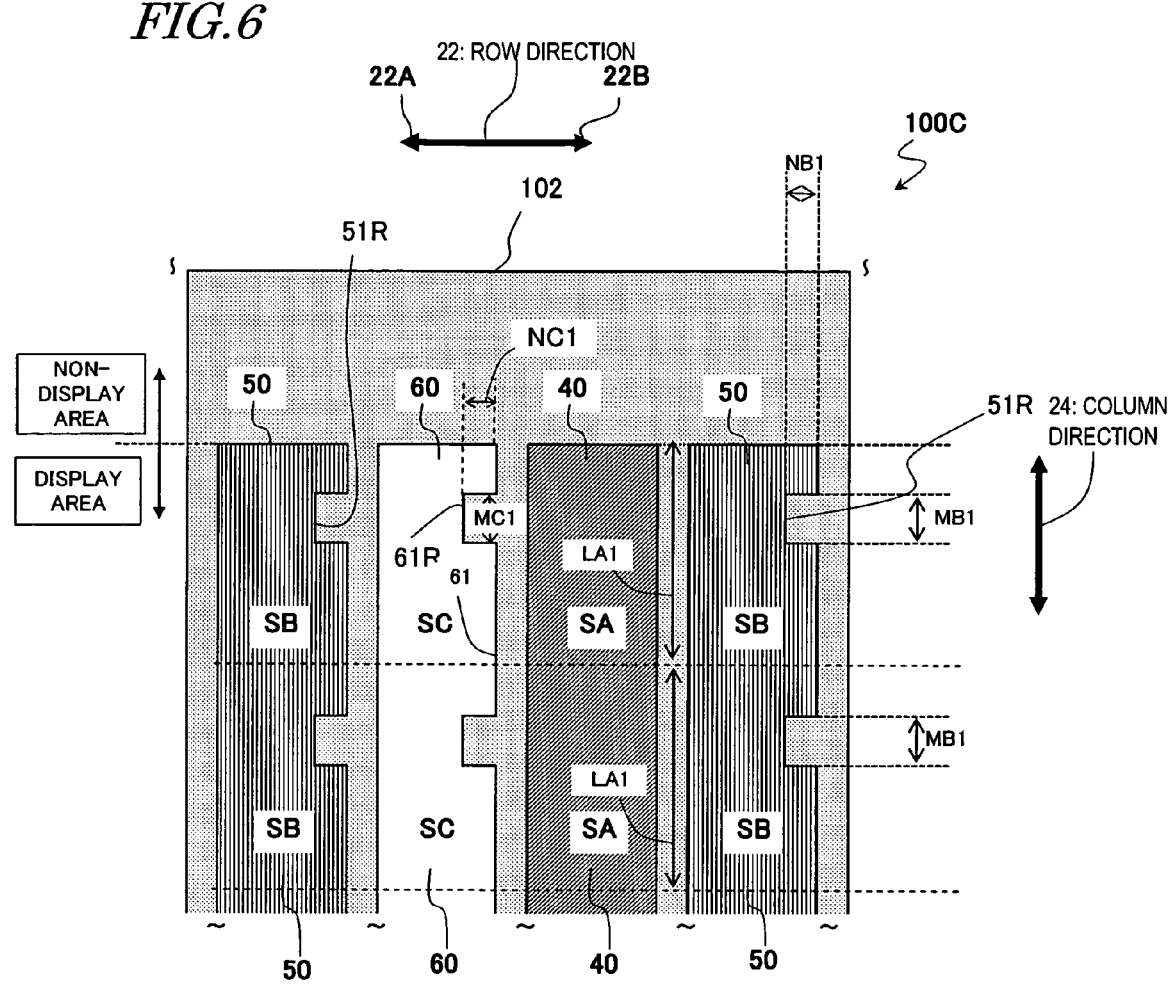
FIG. 6 is a plan view illustrating a color filter substrate according to another modified example of the preferred embodiment shown in FIG. 1.

In the example illustrated in FIG. 6, the first side 51 of each B-color filter 50 (associated with a single pixel) and the first side 61 of each C-color filter 60 (associated with a single pixel) each include just one recess 51R or 61R. Alternatively, in a color filter substrate 100C according to another preferred embodiment of the present invention, the first side 51 of each B-color filter 50 and/or the first side 61 of each C-color filter 60 may each include a plurality of recesses 51R or 61R.

Just like the first-type recess 51R described above, the second-type recess 61R is preferably also defined such that the sum MC1 of the lengths thereof as measured in the column direction is substantially constant in the row direction.

Supposing LA1 is the total length of at least a portion of the first side 41 of each A-color filter 40 at the end of the +x direction 22B, LB1 is the total length of at least a portion of the first side 51 of each B-color filter 50 at the end of the +x direction 22B, LC1 is the total length of at least a portion of the first side 61 of each C-color filter 60 at the end of the +x direction 22B, MB1 is the sum of the lengths of the at least one first-type recess 51R of each B-color filter 50 as measured in the column direction, and MC1 is the sum of the lengths of the at least one second-type recess 61R of each C-color filter 60 as measured in the column direction, the color filter substrate preferably satisfies the equations MB1/LA1=(SA−SB)/SA, LA1=LB1+MB1, MC1/LA1=(SA−SC)/SA and LA1=LC1+MC1.

It should be noted that the length of at least a portion of the first side 41 of each A-color filter 40 extending in the y direction 24 (i.e., $L^0_{(A1)}$ to be described later), that of the first side 51 of each B-color filter 50 extending in the y direction 24 (i.e., $L^0_{(B1)}$ to be described later) and that of the first side 61 of each C-color filter 60 extending in the y direction 24 (i.e., $L^0_{(C1)}$ to be described later) are preferably substantially equal to each other.

In a preferred embodiment, the width NB1 of the at least one first-type recess 51R in the row direction and the width NC1 of the at least one second-type recess 61R in the row direction are preferably each defined so as to be approximately equal to, or greater than, the alignment margin in the row direction.

If red, green and blue color filters are used as the A-color, B-color and C-color filters 40, 50 and 60, then the specific colors of the A-color, B-color and C-color filters 40, 50 and 60 are appropriately determined according to the desired white chromaticity. When the areas SA, SB and SC of the A-color, B-color and C-color filters 40, 50 and 60 satisfy the inequality SA>SC>SB, the A-color filter 40 may be a blue color filter, the B-color filter 50 may be a green color filter, and the C-color filter 60 may be a red color filter, for example.

Hereinafter, a method for fabricating the color filter substrate 100A shown in FIG. 1 will be described. In the following preferred embodiment, a method of making a color filter substrate by a dry film process will be described. A dry film is a photosensitive resin layer, which is normally sandwiched between two film supporting members of polyethylene terephthalate (PET) films, for example. The photosensitive resin layer is one of four types of dry films, in which a red, green, blue or black pigment is dispersed, and is typically negative. A specific exemplary process will be described with reference to FIGS. 7A through 7F.

Specifically, first, a red dry film is attached onto, and rolled on, the glass substrate 102 and then its film supporting members are peeled off, thereby transferring a red photosensitive resin layer 40R onto the substrate 102 as shown in FIG. 7A. This process step is normally carried out with the dry film heated, i.e., a so-called "thermal transfer process". Next, the red photosensitive resin layer 40R thus transferred is exposed to radiation through a mask 2 and then developed, thereby making red color filters 40 as shown in FIG. 7B.

Next, a similar process step is carried out on a green dry film to form green color filters 50 as shown in FIG. 7C. In this process step, the green color filters 50 are provided such that the first side 51 thereof has the first-type recess 51R.

Furthermore, a similar process step is carried out on a blue dry film to form blue color filters 60 as shown in FIG. 7D. In this manner, a color filter layer, including the red, green and blue color filters 40, 50 and 60, is obtained.

Thereafter, as in making the color filter layer, a black dry film is attached onto, and rolled on, the glass substrate 102, thereby transferring a black photosensitive resin layer 30R onto the substrate 102 as shown in FIG. 7E. Then, the black photosensitive resin layer 30R is exposed to a radiation that is applied from under the back surface of the glass substrate 102 (i.e., a backside exposure process is carried out). As a result, the remaining portions of the black photosensitive resin layer 30R are masked and self-aligned with the existing red, green and blue color filters 40, 50 and 60, and then developed. In this manner, a light shielding layer 30, of which the light shielding portions 30A and 30B are arranged in the gaps between the adjacent color filters (as well as in the first-type recesses 51R of the green color filters 50) and in the picture frame area, is obtained. The color filter substrate 100A is obtained as described above.

In the examples illustrated in FIGS. 1, 5 and 6, a column of color filters constitutes a columnar color filter. Alternatively, the column of color filters may not constitute a columnar color filter. The column of color filters may include a plurality of color filters which are divided for respective pixels. Each columnar color filter actually includes a light shielding area to be shielded with a gate bus line (i.e., a linking portion) between two color filters that are adjacent to each other in the column direction. However, the illustration of the linking portions is omitted from the columnar color filters shown in FIGS. 1, 5 and 6.

In each of the color filter substrates 100A, 100B and 100C according to the preferred embodiments described above, the deterioration of color balance due to some misalignment occurring in the row direction is minimized by providing recess(es) for the side(s) (i.e., first and/or second side(s)) of each color filter that define its width in the row direction 22. However, to minimize the deterioration of color balance due to any misalignment occurring in the column direction 24, recess(es) may also be provided for the side(s) of a color filter that define its length in the column direction.

Hereinafter, a color filter substrate, which can avoid the deterioration of color balance by minimizing the unwanted variation in the substantive area ratio among multiple types of color filters even in case of misalignment occurring in the column direction 24 and/or in the row direction 22, will be described.

Figure 8:
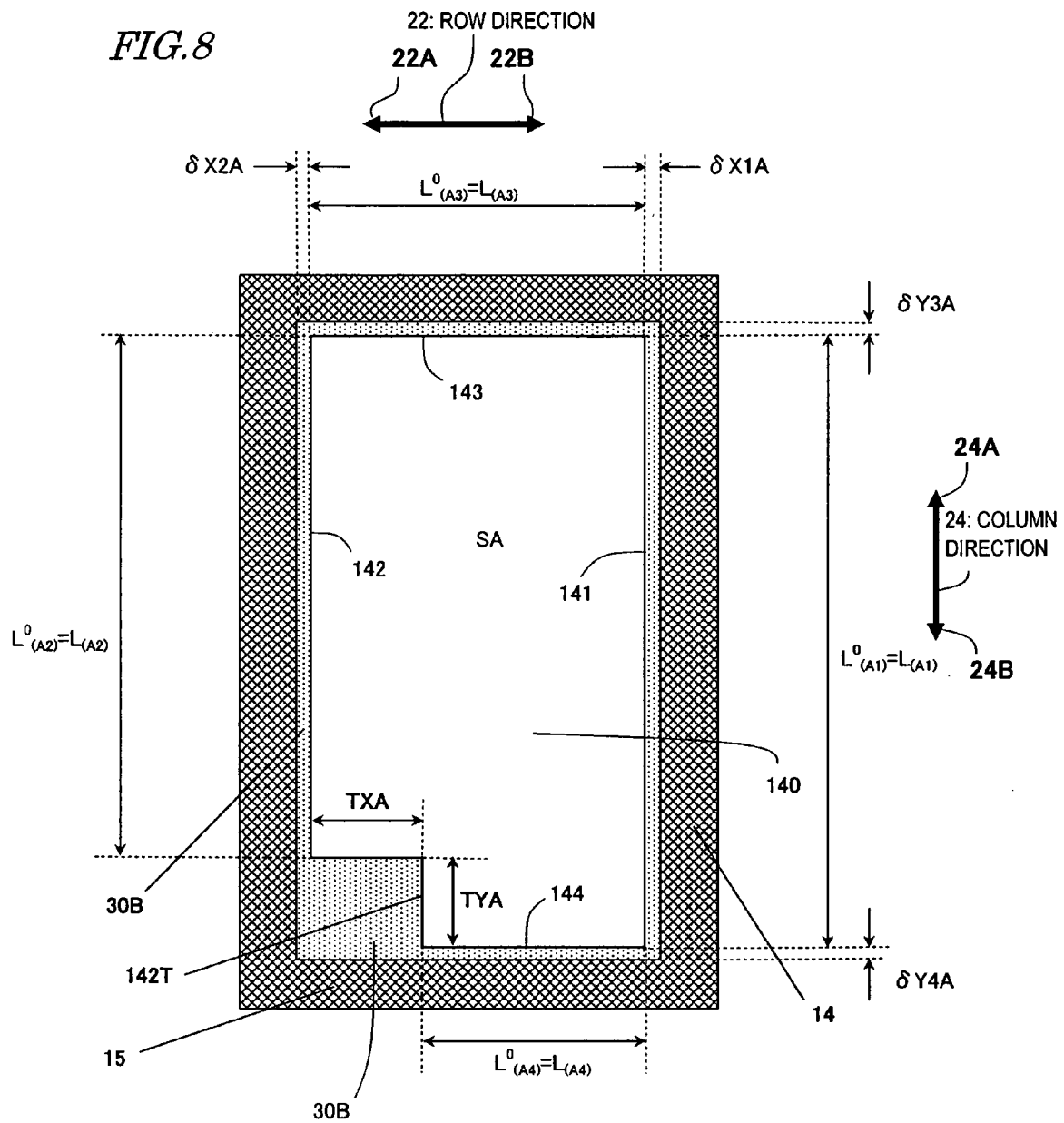
FIG. 8 is a plan view illustrating an N-color filter included in a color filter substrate according to another preferred embodiment of the present invention.
Figure 9:
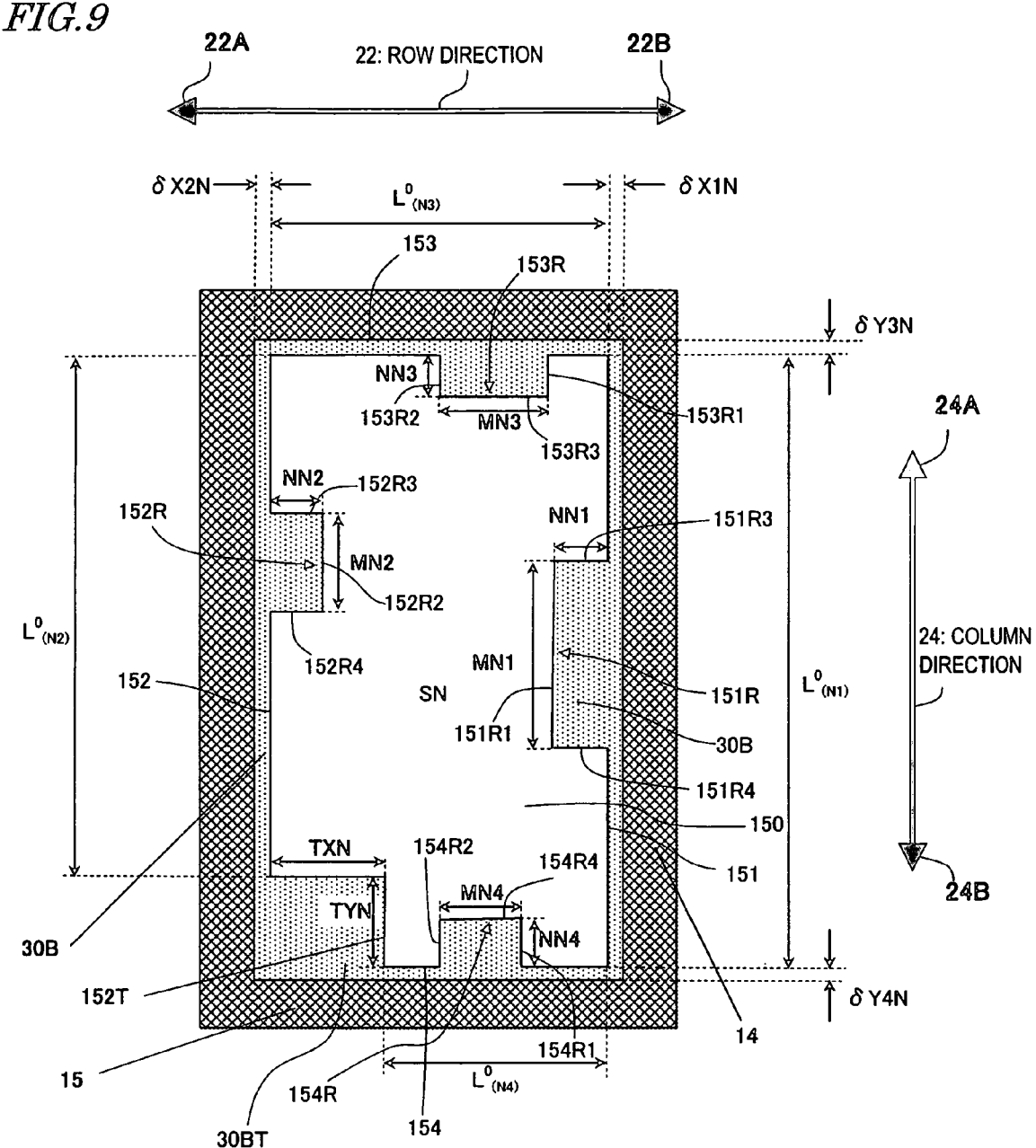
FIG. 9 is a plan view illustrating an A-color filter included in a color filter substrate according to another preferred embodiment of the present invention.

FIG. 8 is a plan view illustrating an A-color filter 140, which has a larger area than any of the other types of color filters included in a color filter substrate according to this preferred embodiment. On the other hand, FIG. 9 is a plan view illustrating an N-color filter 150, which is a color filter of any arbitrary type other than the A-color filter 140. Supposing the areas of the A-color and N-color filters 140 and 150 are identified by SA and SN, respectively, SA>SN is satisfied. Each of the A-color and N-color filters 140 and 150 is associated with a single pixel. By bonding the color filter substrate of this preferred embodiment to an active-matrix substrate including source bus lines 14 and gate bus lines 15 thereon, a liquid crystal display device can be obtained. Each of FIGS. 8 and 9 illustrates not only a portion of the color filter substrate including the color filter 140 or 150 but also the source and gate bus lines 14 and 15 on the active-matrix substrate as well.

The A-color filter 140 shown in FIG. 8 includes first and second sides 141 and 142, which define its width in the row direction 22, and third and fourth sides 143 and 144, which define its length in the column direction 24. In the same way, the N-color filter 150 shown in FIG. 9 includes first and second sides 151 and 152, which define its width in the row direction 22, and third and fourth sides 153 and 154, which define its length in the column direction 24.

Suppose the +x direction 22B is defined as extending from the second side of each color filter toward the first side thereof and the +y direction 24A is defined as extending from the fourth side of each color filter toward the third side thereof.

Each and every color filter included in the color filter substrate of this preferred embodiment preferably includes a TFT shielding recess for shielding its associated TFT on an active-matrix substrate, for example, at the same position. The color filter substrate preferably includes a TFT shielding light shielding portion 30B at the TFT shielding recess of each color filter.

The A-color filter 140 shown in FIG. 8 includes a TFT shielding recess 142T, which has a width TXA in the row direction 22 and a length TYA in the column direction 24, at the intersection between the second and fourth sides 142 and 144 thereof.

On the other hand, the N-color filter 150 shown in FIG. 9 includes a TFT shielding recess 152T, which has a width TXN in the row direction 22 and a length TYN in the column direction 24, at the intersection between the second and fourth sides 152 and 154 thereof.

The width TXA or TXN of the TFT shielding recess in the row direction 22 is typically substantially equal to or greater than the alignment margin in the row direction 22. The length TYA or TYN of the TFT shielding recess in the column direction 24 is typically substantially equal to or greater than the alignment margin in the column direction 24. Accordingly, no matter whether misalignment has occurred in the row direction or in the column direction, the decrease in the effective display area ratio of each color filter is not affected by the TFT shielding recess.

To keep the substantive area ratio of the N-color filter 150 substantially constant even in case of misalignment occurring in the column direction 24, the N-color filter 150 includes recesses 153R and 154R on its third side 153 and fourth side 154, respectively, as shown in FIG. 9. The recess 153R on the third side 153 has a width MN3 in the row direction and a length NN3 in the column direction. The recess 154R on the fourth side 154 has a width MN4 in the row direction and a length NN4 in the column direction. Both of these two recesses 153R and 154R are preferably substantially rectangular.

The recess 153R is made up of three sides 153R1, 153R2 and 153R3. Two 153R1 and 153R2 of these three sides extend in the column direction 24, while the other side 153R3 extends in the row direction 22. In the same way, the recess 154R is made up of three sides 154R1, 154R2 and 154R4. Two 154R1 and 154R2 of these three sides extend in the column direction 24, while the other side 154R4 extends in the row direction 22.

To keep the substantive area ratio of the N-color filter 150 substantially constant even in case of misalignment occurring in the row direction 22, the N-color filter 150 includes recesses 151R and 152R on its first side 151 and second side 152, respectively, as shown in FIG. 9. The recess 151R on the first side 151 has a width NN1 in the row direction and a length MN1 in the column direction. The recess 152R on the second side 152 has a width NN2 in the row direction and a length MN2 in the column direction. Both of these two recesses 151R and 152R are preferably substantially rectangular. The recess 151R is made up of three sides 151R1, 151R3 and 151R4. Two 151R3 and 151R4 of these three sides extend in the row direction 22, while the other side 151R1 extends in the column direction 24. In the same way, the recess 152R is made up of three sides 152R2, 152R3 and 152R4. Two 152R3 and 152R4 of these three sides extend in the row direction 22, while the other side 152R2 extends in the column direction 24.

As long as the width of the recess 153R in the row direction (i.e., the gap between the two sides 153R1 and 153R2 of the recess 153R) is substantially constant in the column direction, the recess 153R does not have to be the substantially rectangular one shown in FIG. 9. In the same way, as long as the width of the recess 154R in the row direction (i.e., the gap between the two sides 154R1 and 154R2 of the recess 154R) is substantially constant in the column direction, the recess 154R does not have to be the substantially rectangular one shown in FIG. 9.

Also, as long as the length of the recess 151R in the column direction (i.e., the gap between the two sides 151R3 and 151R4 of the recess 151R) is substantially constant in the row direction, the recess 151R does not have to be the substantially rectangular one shown in FIG. 9. In the same way, as long as the length of the recess 152R in the column direction (i.e., the gap between the two sides 152R3 and 152R4 of the recess 152R) is substantially constant in the row direction, the recess 152R does not have to be the substantially rectangular one shown in FIG. 9.

As shown in FIG. 8, the length of at least a portion of the first side 141 of the A-color filter 140 extending in the y direction is identified by $L^o_{(A1)}$, the length of at least a portion of the second side 142 of the A-color filter 140 extending in the y direction is identified by $L^o_{(A2)}$, the width of at least a portion of the third side 143 of the A-color filter 140 extending in the x direction is identified by $L^o_{(A3)}$, and the width of at least a portion of the fourth side 144 of the A-color filter 140 extending in the x direction is identified by $L^o_{(A4)}$.

In the same way, the length of at least a portion of the first side 151 of the N-color filter 150 extending in the y direction is identified by $L^o_{(N1)}$, the length of at least a portion of the second side 152 of the N-color filter 150 extending in the y direction is identified by $L^o_{(N2)}$, the width of at least a portion of the third side 153 of the N-color filter 150 extending in the x direction is identified by $L^o_{(N3)}$, and the width of at least a portion of the fourth side 154 of the N-color filter 150 extending in the x direction is identified by $L_{0(N4)}$ as shown in FIG. 9.

It should be noted that $L^o_{(A2)}$ is the length of the second side 142 of the A-color filter 140 extending in the y direction except for that of the TFT shielding recess provided at the same position for the A-color and N-color filters 140 and 150, and that $L^o_{(A4)}$ is the width of the fourth side 144 of the A-color filter 140 extending in the x direction except for that of the TFT shielding recess provided at the same position for the A-color and N-color filters 140 and 150.

In the same way, $L^o_{(N2)}$ is the length of the second side 152 of the N-color filter 150 extending in the y direction except that of the TFT shielding recess provided at the same position for the A-color and N-color filters 140 and 150 and that $L^o_{(N4)}$ is the width of the fourth side 154 of the N-color filter 150 extending in the x direction except that of the TFT shielding recess provided at the same position for the A-color and N-color filters 140 and 150.

Suppose the total length of at least a portion of the first side 141 of the A-color filter 140 at the end of the +x direction 22B is identified by $L_{(A1)}$, the total length of at least a portion of the second side 142 of the A-color filter 140 at the end of the −x direction 22A is identified by $L_{(A2)}$, the total width of at least a portion of the third side 143 of the A-color filter 140 at the end of the +y direction 24A is identified by $L_{(A3)}$, and the total width of at least a portion of the fourth side 144 of the A-color filter 140 at the end of the −y direction 24B is identified by $L_{(A4)}$. Since the A-color filter 140 includes no recesses but the TFT shielding recess 142T, $L_{(A1)}=L^o_{(A1)}$, $L_{(A2)}=L^o_{(A2)}$, $L_{(A3)}=L^o_{(A3)}$ and $L_{(A4)}=L^o_{(A4)}$ are satisfied.

In the same way, suppose the total length of portions of the first side 151 of the N-color filter 150 at the end of the +x direction 22B is identified by $L_{(N1)}$, the total length of portions of the second side 152 of the N-color filter 150 at the end of the −x direction 22A is identified by $L_{(N2)}$, the total width of portions of the third side 153 of the N-color filter 150 at the end of the +y direction 24A is identified by $L_{(N3)}$, and the total width of portions of the fourth side 154 of the N-color filter 150 at the end of the −y direction 24B is identified by $L_{(N4)}$.

It should be noted that each of $L_{(A1)}$ through $L_{(A4)}$ and $L_{(N1)}$ through $L_{(N4)}$ is proportional to the variation in the area of a color filter due to misalignment.

As described above, the N-color filter 150 includes not only the TFT shielding recess 152T but also one recess on each of the first through fourth sides thereof. Accordingly, $L^o_{(N1)}>L_{(N1)}$, $L^o_{(N2)}>L_{(N2)}$, $L^o_{(N3)}>L_{(N3)}$ and $L^o_{(N4)}>L_{(N4)}$ are satisfied. Also, $L^o_{(N1)}=L_{(N1)}+MN1$, $L^o_{(N2)}=L_{(N2)}+MN2$, $L^o_{(N3)}=L_{(N3)}+MN3$ and $L^o_{(N4)}=L_{(N4)}+MN4$ are satisfied.

Hereinafter, a positional relationship between the color filter and the source bus line 14 or gate bus line 15 on the active-matrix substrate will be described.

As shown in FIG. 8, suppose the gap between the portion of the first side 141 of the A-color filter 140 at the end of the +x direction and the source bus line 14 is identified by δX1A, the gap between the portion of the second side 142 of the A-color filter 140 at the end of the −x direction and the source bus line 14 is identified by δX2A, the gap between the portion of the third side 143 of the A-color filter 140 at the end of the +y direction and the gate bus line 15 is identified by δY3A, and the gap between the portion of the fourth side 144 of the A-color filter 140 at the end of the −y direction and the gate bus line 15 is identified by δY4A.

In the same way, suppose the gap between the portion of the first side 151 of the N-color filter 150 at the end of the +x direction and the source bus line 14 is identified by δX1N, the gap between the portion of the second side 152 of the N-color filter 150 at the end of the −x direction and the source bus line 14 is identified by δX2N, the gap between the portion of the third side 153 of the N-color filter 150 at the end of the +y direction and the gate bus line 15 is identified by δY3N, and the gap between the portion of the fourth side 154 of the N-color filter 150 at the end of the −y direction and the gate bus line 15 is identified by δY4N as shown in FIG. 9.

In the color filter substrate of this preferred embodiment, the color filters thereof are preferably designed such that the gap between a predetermined point of one color filter and the source bus line 14 or gate bus line 15 is substantially equal to the gap between its associated point of any other color filter and the source or gate bus line 14 or 15. That is to say, the color filter substrate preferably satisfies δX1A=δX1N, δX2A=δX2N, δY3A=δY3N, and δY4A=δY4N.

Optionally, each color filter may also be arranged so as to overlap with its associated source bus line 14 and/or gate bus line 15. In that case, the aperture ratio can be increased and a brighter image can be displayed effectively.

Accordingly, unless the color filter overlaps with an adjacent pixel (i.e., a display pixel in a different color), each of the δX1A, δX2A, δY3A and δY4A values may be not just a positive value but also zero or a negative value (representing a situation where the color filter overlaps with the source bus line 14 and/or gate bus line 15).

The present invention is particularly effective when each of the δX1A, δX2A, δY3A and δY4A values is set to either approximately equal to zero or a negative value to increase the aperture ratio. That is to say, the present invention is especially effectively applicable to a situation where each of the δX1A, δX2A, δY3A and δY4A values is less than the alignment margin and cannot contribute to minimizing the variation in the area ratio of a color filter due to misalignment.

As for the N-color filter 150, NN3+δY3N and NN4+δY4N are preferably defined so as to be substantially equal to or greater than the alignment margin in the column direction 24. Also, NN1+δ1N and NN2+δX2N are preferably defined so as to be substantially equal to or greater than the alignment margin in the row direction 22. This is because the variation in the area ratio of the color filter can be minimized in that case irrespective of the magnitude of the misalignment.

In this preferred embodiment, the recesses 153R and 154R of the N-color filter 150 are preferably defined so as to satisfy $L_{(N3)}/L_{(A3)}$=SN/SA (Equation (1)) and $L_{(N4)}/L_{(A4)}$=SN/SA (Equation (2)).

If the recesses 153R and 154R are defined so as to satisfy Equations (1) and (2) and if the shift of the active-matrix substrate with respect to the color filter substrate in the column direction 24 is at most substantially equal to the length of the recess 153R or 154R in the column direction, then the ratio of the effective display area of the A-color filter 140 to that of the N-color filter 150 can always be substantially equal to the ratio of the overall area SA of the A-color filter 140 to the overall area SN of the N-color filter 150 irrespective of the magnitude of the misalignment.

In addition, in this preferred embodiment, the recesses 151R and 152R of the N-color filter 150 are preferably defined so as to satisfy $L_{(N1)}/L_{(A1)}$=SN/SA (Equation (3)) and $L_{(N2)}/L_{(A2)}$=SN/SA (Equation (4)). If the recesses 151R and 152R are defined so as to satisfy Equations (3) and (4) and if the shift of the active-matrix substrate with respect to the color filter substrate in the row direction 22 is at most substantially equal to the width of the recess 151R or 152R in the row direction, then the ratio of the effective display area of the A-color filter 140 to that of the N-color filter 150 can always be substantially equal to the ratio of the overall area SA of the A-color filter 140 to the overall area SN of the N-color filter 150 irrespective of the magnitude of the misalignment.

By defining the recesses on all of the four sides of the N-color filter 150 so as to satisfy each of Equations (1) through (4), the ratio of the effective display area of the A-color filter 140 to that of the N-color filter 150 can always be substantially equal to the ratio of the overall area SA of the A-color filter 140 to the overall area SN of the N-color filter 150 no matter whether the misalignment has occurred in the row direction or in the column direction.

Furthermore, the gap between the side 153R1 of the recess 153R, on the third side 153 of the N-color filter 150 at the end of the +x direction and the portion of the first side 151 thereof at the end of the +x direction and the gap between the side 153R2 of the recess 153R on the third side 153 of the N-color filter 150 at the end of the −x direction and the portion of the second side 152 thereof at the end of the −x direction are preferably each defined so as to be greater than the alignment margin in the row direction. In the same way, the gap between the side 154R1 of the recess 154R on the fourth side 154 of the N-color filter 150 at the end of the +x direction and the portion of the first side 151 thereof at the end of the +x direction and the gap between the side 154R2 of the recess 154R on the fourth side 154 of the N-color filter 150 at the end of the −x direction and the portion of the second side 152 thereof at the end of the −x direction are preferably each defined so as to be greater than the alignment margin in the row direction.

Otherwise, if misalignment has occurred in the row direction, then the recesses 153R and 154R, which are provided for the purpose of minimizing the deterioration of color balance due to misalignment in the column direction, will affect the percentage of decrease in the effective display area of the color filter.

In the color filter substrate of the preferred embodiment described above, the N-color filter 150 includes the recesses 153R and 154R, each being recessed in the column direction, on the third and fourth sides 153 and 154 that define the length of the color filter 150 in the column direction 24. Accordingly, even if the active-matrix substrate bonded has shifted with respect to the color filter substrate in either pixel column direction 24A or 24B, the ratio of the area of a portion of the A-color filter 140 shielded with a gate bus line 15 on the active-matrix substrate to that of a portion of the N-color filter 150 shielded with the same gate bus line can be substantially equal to the ratio of the overall area SA of the A-color filter 140 to the overall area SN of the N-color filter 150.

Furthermore, in the color filter substrate of this preferred embodiment, the N-color filter 150 also includes the recesses 151R and 152R, each being recessed in the row direction, on the first and second sides 151 and 152 that define the width of the color filter 150 in the row direction 24. Accordingly, even if the active-matrix substrate bonded has shifted with respect to the color filter substrate in either pixel row direction 22A or 22B, the ratio of the non-shielded effective display area of the A-color filter 140 to that of the N-color filter 150 can be substantially equal to the ratio of the overall area SA of the A-color filter 140 to the overall area SN of the N-color filter 150.

Thus, no matter whether misalignment has occurred in the column direction or in the row direction, the ratio of the non-shielded effective display area of the A-color filter 140 to that of the N-color filter 150 can always be substantially equal to the ratio of the overall area SA of the A-color filter 140 to the overall area SN of the N-color filter 150. Consequently, even if the active-matrix substrate bonded has shifted with respect to a color filter substrate in which the ratio of the areas of multiple types of color filters is adjusted (i.e., the areas of color filters change on a color-by-color basis) so as to achieve desired white chromaticity, the resultant white chromaticity will not vary from its desired value.

The preferred embodiments of the present invention described above relate to a typical arrangement that can maintain a substantially constant substantive area ratio between at least two types of color filters even in case of misalignment occurring in the column direction or in the row direction. However, the N-color filter of the color filter substrate of this preferred embodiment does not have to have such a configuration. Alternatively, if at least $L^0_{(N1)} > L_{(N1)}$, $L^0_{(N2)} > L_{(N2)}$, $L^0_{(N3)} > L_{(N3)}$ and $L^0_{(N4)} > L_{(N4)}$ are satisfied by providing a recess for each of the first through fourth sides of the N-color filter, then the variation in the substantive area ratio of the color filter can be minimized even in case of misalignment occurring in the column direction or in the row direction.

Also, in the preferred embodiments described above, each of the first through fourth sides of the N-color filter 150 preferably includes one recess, for example. Optionally, each side may include two or more recesses.

In a color filter substrate, the recess of each color filter is filled with a light shielding portion 30B. Accordingly, if too many recesses were provided for each side of the color filter, then the aperture ratio (or the brightness) might decrease significantly. For that reason, it should be appropriately determined according to the desired aperture ratio how many sides of the color filter should be provided with the recesses.

If at least one of the first, second, third and fourth sides 151, 152, 153 and 154 of the N-color filter 150 is provided with a recess such that at least one of the inequalities $L^0_{(N1)} > L_{(N1)}$, $L^0_{(N2)} > L_{(N2)}$, $L^0_{(N3)} > L_{(N3)}$ and $L^0_{(N4)} > L_{(N4)}$ is satisfied, then the variation in the substantive area ratio of the color filter can be minimized even in case of misalignment occurring in at least one of the row and column directions 22A, 22B, 24A and 24B. It should be noted that if recesses are provided for one or two sides, the recesses are preferably provided for at least one of the first and second sides 151 and 152 that define the width of the color filter in the row direction 22 in which the area ratio of the color filter may change significantly.

Hereinafter, an exemplary arrangement for a color filter substrate, in which the substantive area of a color filter does not change even in case of misalignment occurring in the column direction 24, will be described. By adopting such an arrangement in which neither the substantive area ratio nor the area itself changes even in case of misalignment occurring in the column direction 24, not just the deterioration of color balance but also the decrease in aperture ratio can be eliminated effectively.

Also, by providing recesses for a predetermined color filter other than a color filter having the maximum area such that the variation in the area ratio due to misalignment in the row direction is reduced significantly, the deterioration of color balance can be minimized even in case of misalignment occurring in both the row and column directions (i.e., obliquely).

Figure 10A:
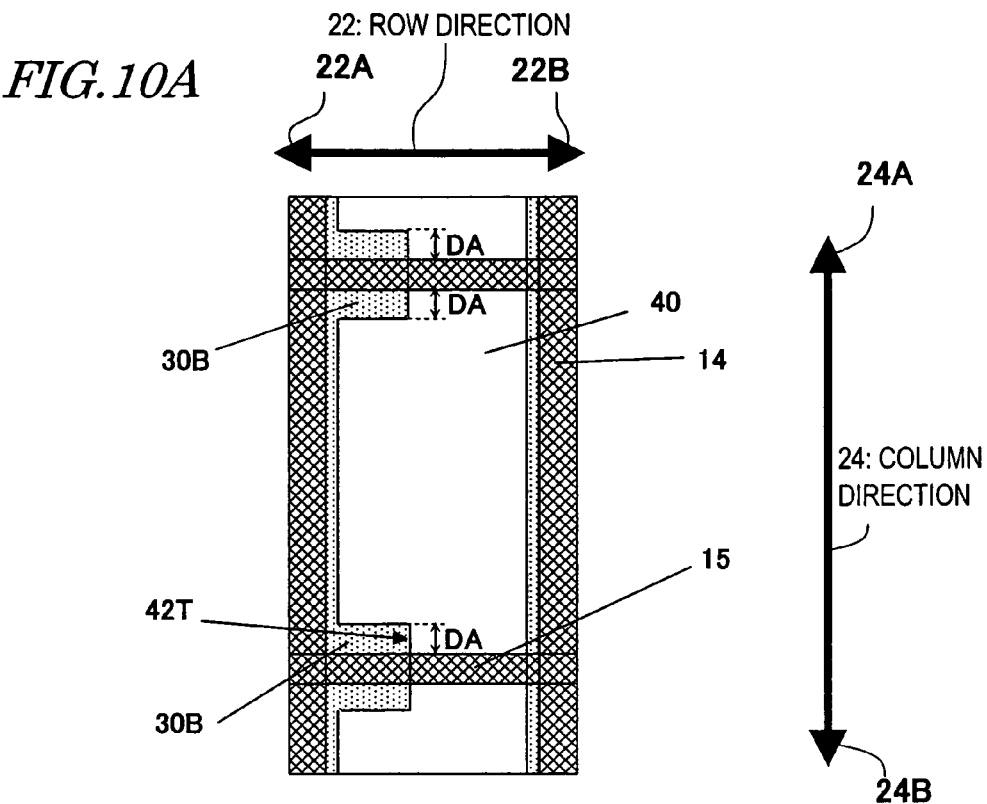
FIGS. 10A and 10B are plan views illustrating a color filter included in a color filter substrate according to another preferred embodiment of the present invention.
Figure 10B:
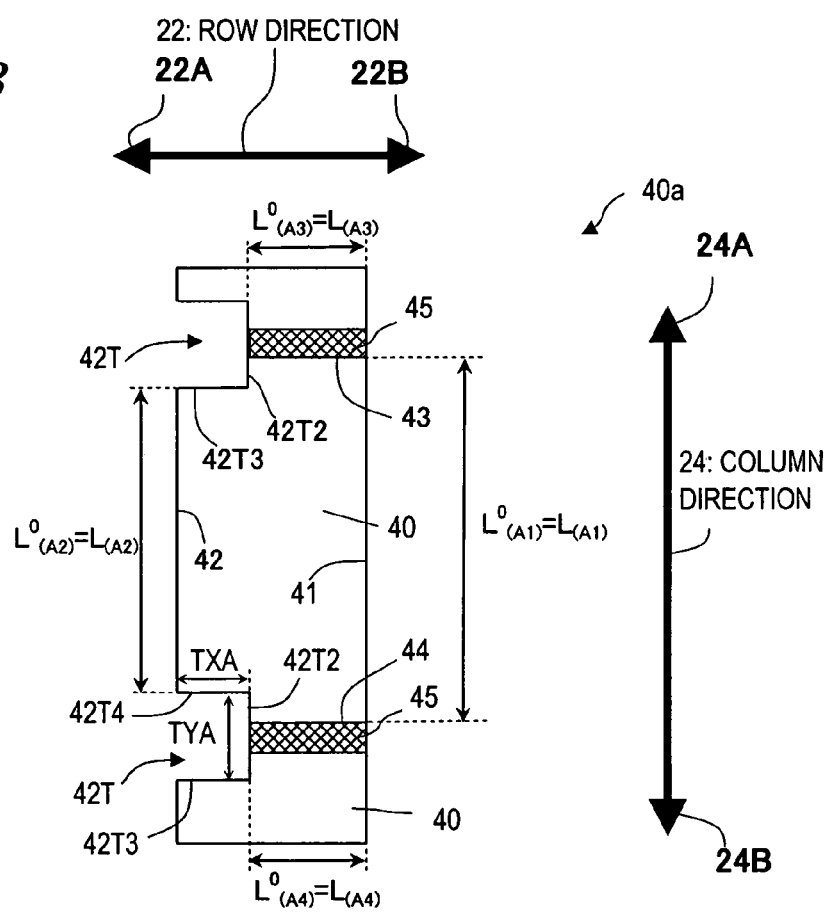
Figure 11A:
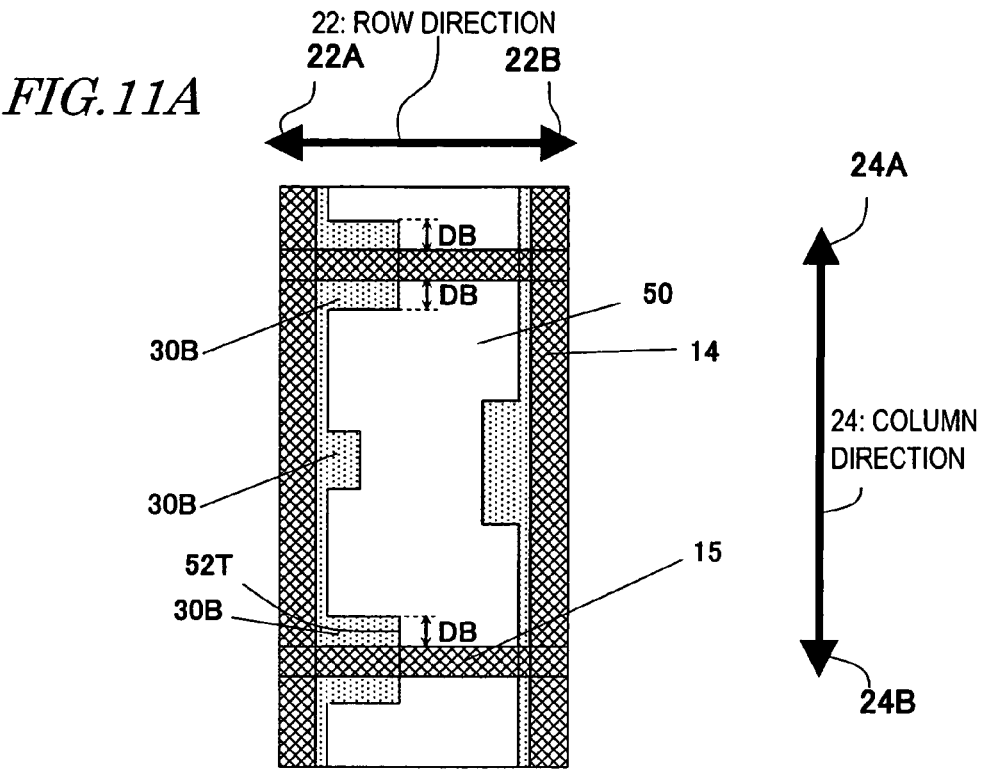
FIGS. 11A and 11B are plan views illustrating a color filter included in a color filter substrate according to another preferred embodiment of the present invention.
Figure 11B:
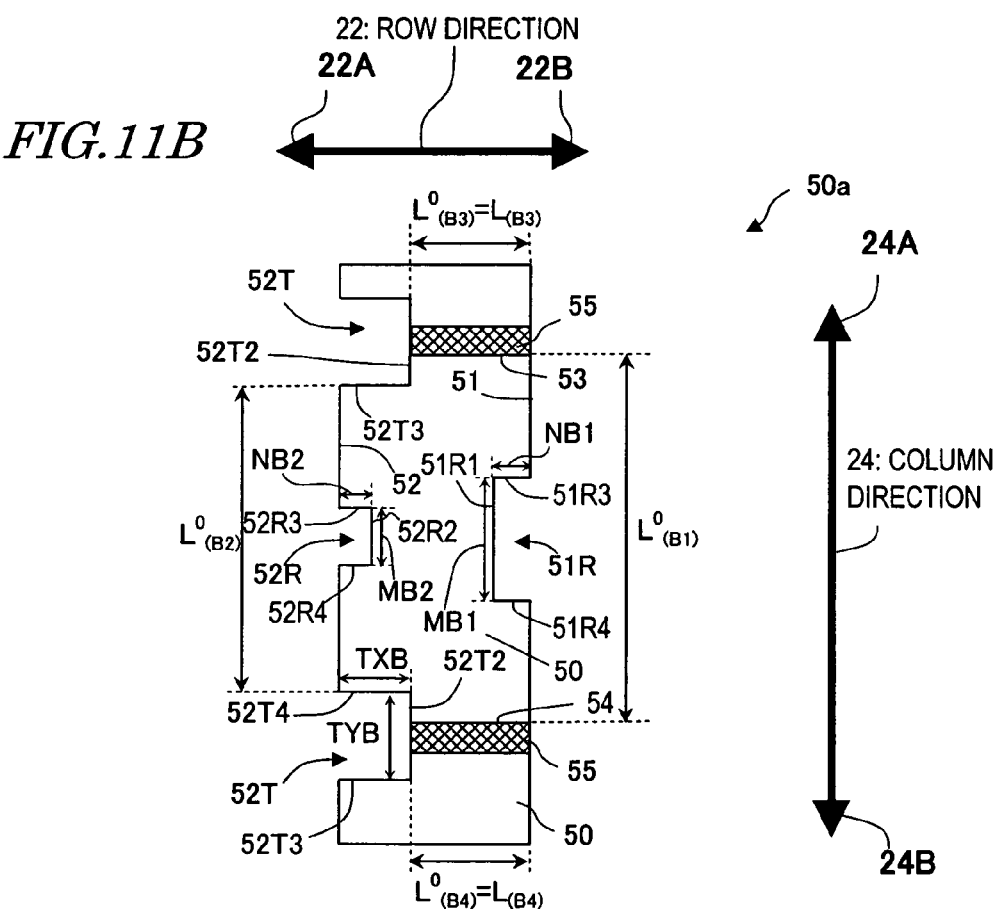

FIGS. 10A and 10B schematically illustrate an A-color filter 40 having a greater area than any other color filter in the color filter substrate of this preferred embodiment. FIGS. 11A and 1B schematically illustrate an arbitrary color filter (e.g., B-color filter 50) other than the A-color filter 40. Supposing the areas of the A-color and B-color filters 40 and 50 are identified by SA and SB, respectively, SA>SB is satisfied. FIG. 10B shows the specific dimensions of the A-color filter 40 shown in FIG. 10A, while FIG. 11B shows the specific dimensions of the B-color filter 50 shown in FIG. 11A.

By bonding the color filter substrate of this preferred embodiment to an active-matrix substrate including source bus lines 14 and gate bus lines 15 thereon, a liquid crystal display device can be obtained. Each of FIGS. 10A and 11A illustrates not only a portion of the color filter substrate including the color filter 40 or 50 but also the source and gate bus lines 14 and 15 on the active-matrix substrate as well.

A set of color filters included in the color filter substrate of this preferred embodiment constitutes a striped "columnar color filter" with linking portions. As used herein, the "columnar color filter" refers to a series of color filters, which are associated with a plurality of pixels arranged consecutively in the column direction and which are combined together in the column direction by way of linking portions. The linking portion is an area in which the columnar color filter is shielded with a light shielding member on a substrate facing the color filter substrate (e.g., a gate bus line on a TFT substrate). Accordingly, the position of the linking portion in the column direction shifts according to the magnitude of misalignment between the color filter substrate and its opposing substrate.

Each color filter associated with a pixel is defined between a pair of linking portions arranged in the column direction. The third and fourth sides of a color filter (associated with a pixel and) included in a columnar color filter are defined as follows. Specifically, the third side of a color filter defines the edge of the color filter at the end of the +y direction (i.e., column direction 24A) and the edge of the upper linking portion at the beginning of the −y direction (i.e., column direction 24B). On the other hand, the fourth side of a color filter defines the edge of the color filter at the end of the −y direction (i.e., column direction 24B) and the edge of the lower linking portion at the beginning of the +y direction (i.e., column direction 24A).

The first and second sides of each color filter included in a columnar color filter are two edges that define the width of the color filter in the row direction 22. On the other hand, the first and second sides of each columnar color filter are two groups of edges that define the widths of the columnar color filter in the row direction 22. Specifically, the two groups of edges include a group of edges defining the width of the color filters in the row direction 22 and another group of edges defining the width of the linking portions.

If any of the first, second, third and fourth sides of a color filter includes a recess and is made up of multiple segments, then the side includes all of those segments.

As shown in FIGS. 10A and 10B, a columnar A-color filter 40a is made up of a number of A-color filters 40, associated with adjacent pixel rows, and linking portions 45 that combine the A-color filters 40 together. In the same way, a columnar B-color filter 50a is made up of a number of B-color filters 50, associated with adjacent pixel rows, and linking portions 55 that combine the B-color filters 50 together as shown in FIGS. 11A and 11B.

The columnar A-color filter 40a shown in FIGS. 10A and 10B includes a first side 41 and a second side 42. Each color filter (associated with a pixel and) included in the columnar A-color filter 40a includes the first and second sides 41 and 42, a third side 43 and a fourth side 44.

Each and every columnar color filter in the color filter substrate of this preferred embodiment includes a TFT shielding recess for shielding its associated TFT on an active-matrix substrate, for example, at the same position.

In the columnar A-color filter 40a shown in FIGS. 10A and 10B, the second side 42 thereof includes a TFT shielding recess 42T, which is made up of upper and lower edges 42T4 and 42T3 with a width TXA in the row direction 22 and a bottom edge 42T2 with a length TYA in the column direction 24. The recess 42T preferably has a substantially rectangular shape. The upper and lower edges 42T4 and 42T3 of the recess 42T extend substantially parallel to each other in the row direction 22 while the bottom edge 42T2 thereof extends in the column direction 24.

It should be noted that the recess 42T does not have to be substantially rectangular as long as the length of the recess 42T in the column direction 24 is substantially constant in the row direction (i.e., if the gap TYA between the upper and lower edges 42T4 and 42T3 of the recess 42T is substantially constant in the row direction 22).

The second side 42 of the columnar A-color filter 40a at each linking portion 45 is included in the bottom edge 42T2 of its associated recess 42T that is provided for the columnar A-color filter 40a. That is to say, the second side 42 at the linking portion 45 and the bottom edge 42T2 of the recess 42T are the same segment.

The length TYA of the bottom edge 42T2 of the recess 42T is preferably substantially equal to or greater than the alignment margin in the column direction. On the other hand, the width TXA of the upper and lower edges 42T4 and 42T3 of the recess 42T is preferably substantially equal to or greater than the alignment margin in the row direction.

If misalignment has occurred in the column direction, then the linking portion 45 shifts in the column direction 24. However, as long as the magnitude of misalignment is within the alignment margin in the column direction 24, the area of the linking portion 45 remains the same.

FIGS. 10A and 10B show a situation where the color filter substrate of this preferred embodiment and an active-matrix substrate have been bonded together in an ideal arrangement. Accordingly, if a color filter substrate and an active-matrix substrate have been bonded together so as to satisfy an ideal positional relationship, the columnar A-color filter 40a will be symmetric in the column direction with respect to the linking portion 45.

The second side 42 of each linking portion 45 is located at the center of the bottom edge 42T2 of its associated recess 42T. That is to say, as indicated by DA in FIG. 10A, the gap between the edge of the linking portion 45 facing the +x direction 24A and the upper edge 42T4 of the recess 42T in the column direction 24 is substantially equal to the gap between the edge of the linking portion 45 facing the −x direction 24B and the lower edge 42T3 of the recess 42T in the column direction 24.

Even if the linking portion 45 has shifted in the column direction 24 due to misalignment that has occurred in the column direction, the substantive area of the A-color filter 40 associated with one pixel can be maintained at, and does not change from, a constant value SA as long as the magnitude of the misalignment is within the length TYA of the bottom edge 42T2 of the recess 42T.

The columnar B-color filter 50a shown in FIGS. 11A and 11B includes a first side 51 and a second side 52. Each color filter 50 (associated with a pixel and) included in the columnar B-color filter 50a includes the first and second sides 51 and 52, a third side 53 and a fourth side 54.

In the columnar B-color filter 50a shown in FIGS. 11A and 11B, the second side 52 thereof includes a TFT shielding recess 52T, which is made up of upper and lower edges 52T4 and 52T3 with a width TXB in the row direction 22 and a bottom edge 52T2 with a length TYB in the column direction 24. The recess 52T preferably has a substantially rectangular shape. The upper and lower edges 52T4 and 52T3 of the recess 52T extend substantially parallel to each other in the row direction 22 while the bottom edge 52T2 thereof extends in the column direction 24.

It should be noted that the recess 52T, as well as the recess 42T, does not have to be substantially rectangular, either.

The recess 52T of the columnar B-color filter 50a is preferably provided at the same location as the recess 42T of the columnar A-color filter 40a.

The second side 52 of the columnar B-color filter 50a at each linking portion 55 is included in the bottom edge 52T2 of its associated recess 52T that is provided for the columnar B-color filter 50a. That is to say, the second side 52 at the linking portion 55 and the bottom edge 52T2 of the recess 52T are the same segment.

The length TYB of the bottom edge 52T2 of the recess 52T is preferably substantially equal to or greater than the alignment margin in the column direction. On the other hand, the width TXB of the upper and lower edges 52T4 and 52T3 of the recess 52T is preferably substantially equal to or greater than the alignment margin in the row direction.

The columnar B-color filter 50a includes not only the TFT-shielding recesses 52T but also recesses 51R and 52R on its first and second sides 51 and 52, respectively.

The recess 51R provided on the first side 51 has a width NB1 in the row direction and a length MB1 in the column direction. The recess 52R provided on the second side 52 has a width NB2 in the row direction and a length MB2 in the column direction. Both of these recesses 51R and 52R are preferably substantially rectangular. The recess 51R is made up of upper and lower edges 51R3 and 51R4 and a bottom edge 51R1. The upper and lower edges 51R3 and 51R4 extend substantially parallel to each other in the row direction 22, while the bottom edge 51R1 extends in the column direction 24. In the same way, the recess 52R is also made up of upper and lower edges 52R3 and 52R4 and a bottom edge 52R2. The upper and lower edges 52R3 and 52R4 extend substantially parallel to each other in the row direction 22, while the bottom edge 52R2 extends in the column direction 24.

If a color filter substrate and an active-matrix substrate have been bonded together so as to satisfy an ideal positional relationship, the columnar B-color filter 50a, as well as the columnar A-color filter 40a, will be symmetric in the column direction with respect to the linking portion 55.

The second side 52 of each linking portion 55 is located at the center of the bottom edge 52T2 of its associated recess 52T. That is to say, as indicated by DB in FIG. 11A, the gap between the edge of the linking portion 55 facing the +x direction 24A and the upper edge 52T4 of the recess 52T in the column direction 24 is substantially equal to the gap between the edge of the linking portion 55 facing the −x direction 24B and the lower edge 52T3 of the recess 52T in the column direction 24.

If misalignment has occurred in the column direction, then the linking portion 55 shifts in the column direction 24. However, as long as the magnitude of misalignment is within the alignment margin in the column direction 24, the area of the linking portion 55 remains the same. Accordingly, even if misalignment has occurred in the column direction, the substantive area of a color filter changes neither in the columnar A-color filter 40a nor in the columnar B-color filter 50a.

As shown in FIG. 10B, suppose the length of at least a portion of the first side 41 of the A-color filter 40 extending in the y direction (i.e., column direction 24) is identified by $L^o_{(A1)}$, the length of at least a portion of the second side 42 thereof extending in the y direction is identified by $L^o_{(A2)}$, the width of at least a portion of the third side 43 thereof extending in the x direction (i.e., row direction 22) is identified by $L^o_{(A3)}$ and the width of at least a portion of the fourth side 44 thereof extending in the x direction is identified by $L^o_{(A4)}$.

In the same way, suppose the length of at least a portion of the first side 51 of the B-color filter 50 extending in the y direction is identified by $L^o_{(B1)}$, the length of at least a portion of the second side 52 thereof extending in the y direction is identified by $L^o_{(B2)}$, the width of at least a portion of the third side 53 thereof extending in the x direction is identified by $L^o_{(B3)}$ and the width of at least a portion of the fourth side 54 thereof extending in the x direction is identified by $L^o_{(B4)}$ as shown in FIG. 11B.

It should be noted that $L^o_{(A2)}$ is the length of the second side 42 of the A-color filter 40 extending in the y direction except that of the TFT shielding recess 42T provided at the same position for the A-color and B-color filters 40 and 50 and that $L^o_{(A3)}$ and $L^o_{(A4)}$ are the widths of the third and fourth sides 43 and 44 of the A-color filter 40 extending in the x direction except that of the TFT shielding recess 42T provided at the same position for the A-color and B-color filters 40 and 50.

In the same way, $L^o_{(B2)}$ is the length of the second side 52 of the B-color filter 50 extending in the y direction except that of the TFT shielding recess 52T provided at the same position for the A-color and B-color filters 40 and 50 and that $L^o_{(B3)}$ and $L^o_{(B4)}$ are the widths of the third and fourth sides 53 and 54 of the B-color filter 50 extending in the x direction except that of the TFT shielding recess 52T provided at the same position for the A-color and B-color filters 40 and 50.

Suppose the total length of at least a portion of the first side 41 of the A-color filter 40 at the end of the +x direction 22B is identified by $L_{(A1)}$, the total length of at least a portion of the second side 42 of the A-color filter 40 at the end of the −x direction 22A is identified by $L_{(A2)}$, the total width of at least a portion of the third side 43 of the A-color filter 40 at the end of the +y direction 24A is identified by $L_{(A3)}$, and the total width of at least a portion of the fourth side 44 of the A-color filter 40 at the end of the −y direction 24B is identified by $L_{(A4)}$. Since the A-color filter 40 includes no recesses but the TFT shielding recess 42T, $L_{(A1)}=L^o_{(A1)}$, $L_{(A2)}=L^o_{(A2)}$, $L_{(A3)}=L^o_{(A3)}$ and $L_{(A4)}=L^o_{(A4)}$ are satisfied.

In the same way, suppose the total length of portions of the first side 51 of the B-color filter 50 at the end of the +x direction 22B is identified by $L_{(B1)}$, the total length of portions of the second side 52 of the B-color filter 50 at the end of the −x direction 22A is identified by $L_{(B2)}$, the width of at least a portion of the third side 53 of the B-color filter 50 at the end of the +y direction 24A is identified by $L_{(B3)}$, and the width of at least a portion of the fourth side 54 of the B-color filter 50 at the end of the −y direction 24B is identified by $L_{(B4)}$. As described above, the B-color filter 50 includes not only the TFT shielding recess 52T but also the recesses 51R and 52R on the first and second sides 51 and 52 thereof, respectively. Accordingly, $L^o_{(B1)}>L_{(B1)}$, $L^o_{(B2)}>L_{(B2)}$, $L^o_{(B1)}=L_{(B1)}+MB1$ and $L^o_{(B2)}=L_{(B2)}+MB2$ are satisfied.

The recesses 51R and 52R are designed such that the equations $L_{(B1)}/L_{(A1)}=SB/SA$ and $L_{(B2)}/L_{(A2)}=SB/SA$ are satisfied. If the recesses 51R and 52R are defined so as to satisfy these equations and if the shift of the active-matrix substrate with respect to the color filter substrate in the row direction 22 is at most substantially equal to the width of the recess 51R or 52R in the row direction, then the ratio of the effective display area of the A-color filter 40 to that of the B-color filter 50 can always be equal to the ratio of the overall area SA of the A-color filter 40 to the overall area SB of the B-color filter 50 irrespective of the magnitude of the misalignment.

In the color filter substrate of the preferred embodiment described above, if misalignment has occurred in the column direction, the substantive area of each color filter can be maintained at a constant value. On the other hand, if misalignment has occurred in the row direction, the substantive area ratio of multiple color filters can be maintained. Accordingly, even if misalignment has occurred in both of the column and row directions, the substantive area ratio of multiple color filters can be maintained and the white chromaticity never varies from its desired value.

A color filter substrate according to another preferred embodiment, in which the substantive area of no color filter changes even in case of misalignment occurring in the column direction 24, will be described.

Figure 12A:
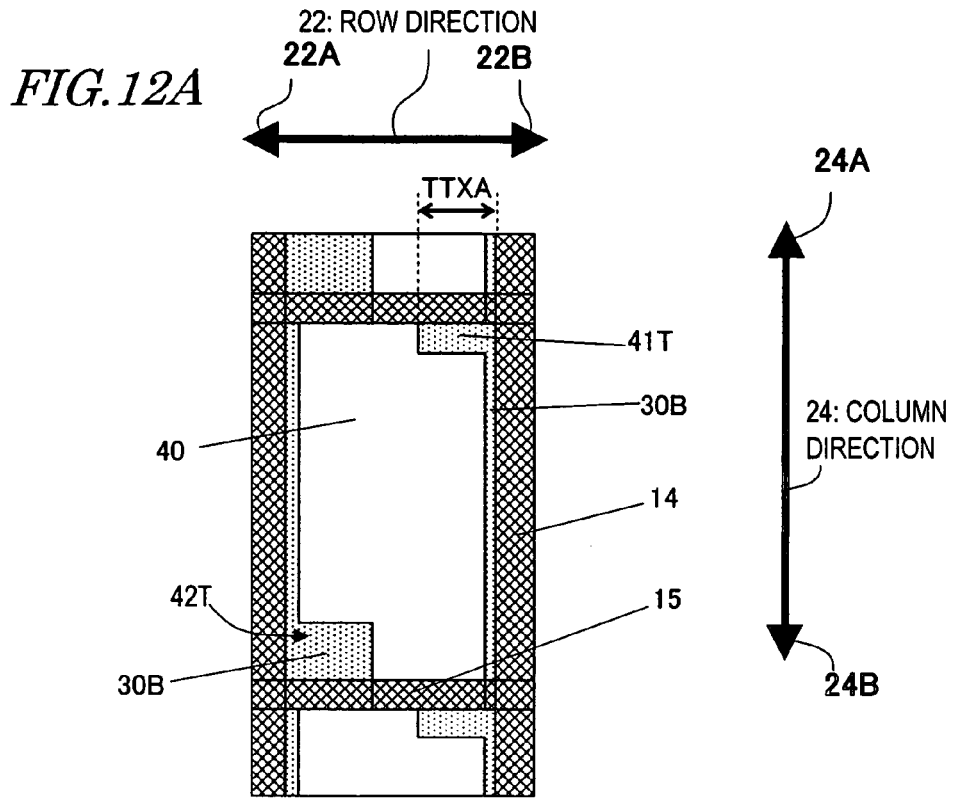
FIGS. 12A and 12B are plan views illustrating a color filter included in a color filter substrate according to another preferred embodiment of the present invention.
Figure 12B:
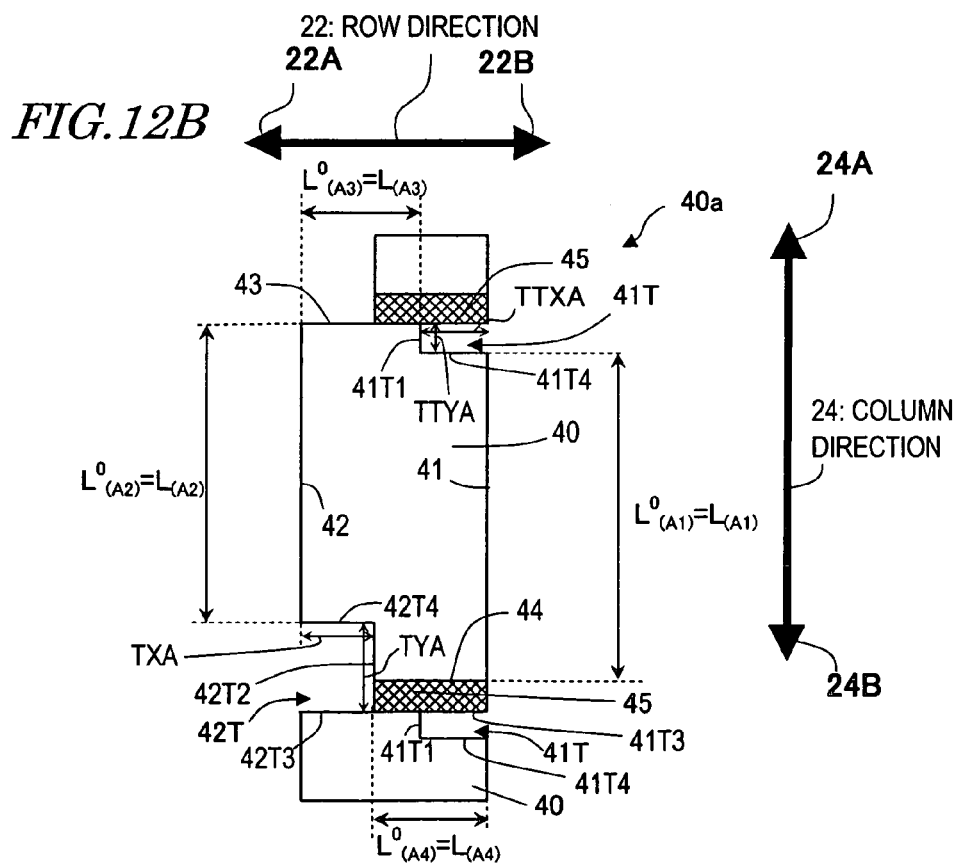
Figure 13A:
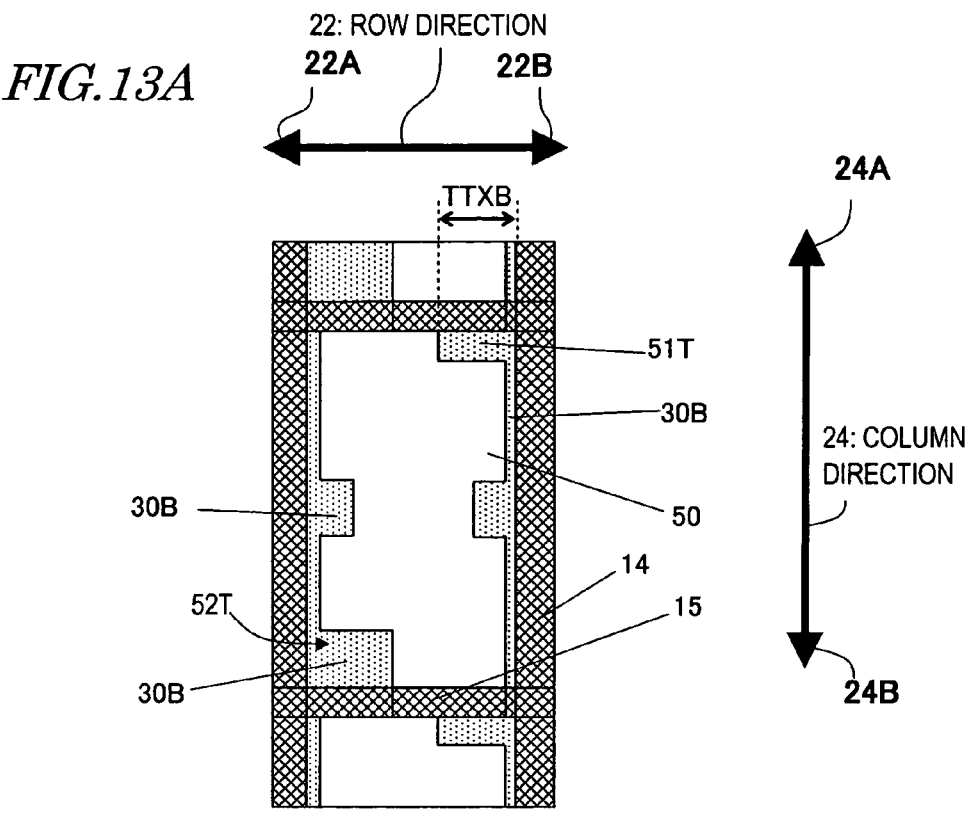
FIGS. 13A and 13B are plan views illustrating a color filter included in a color filter substrate according to another preferred embodiment of the present invention.
Figure 13B:
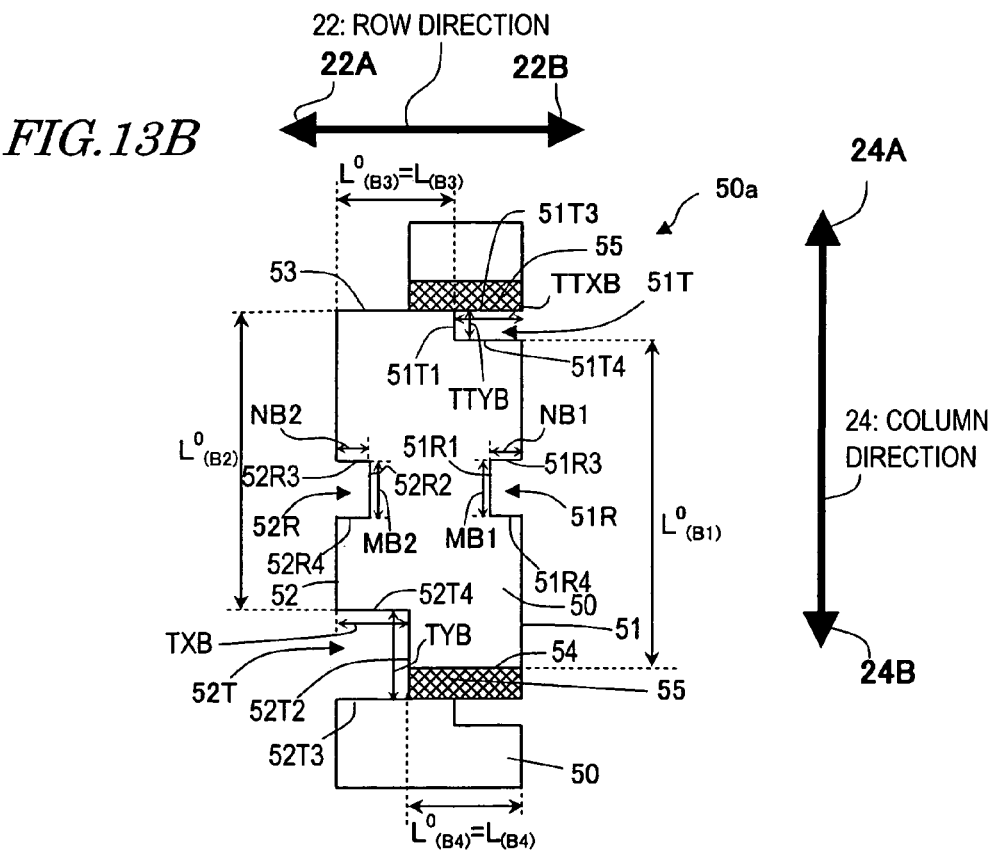

FIGS. 12A and 12B schematically illustrate an A-color filter 40 having a greater area than any other color filter in the color filter substrate of this preferred embodiment. FIGS. 13A and 13B schematically illustrate an arbitrary color filter (e.g., B-color filter 50) other than the A-color filter 40. Supposing the areas of the A-color and B-color filters 40 and 50 are identified by SA and SB, respectively, SA>SB is satisfied. FIG. 12B shows the specific dimensions of the A-color filter 40 shown in FIG. 12A, while FIG. 13B shows the specific dimensions of the B-color filter 50 shown in FIG. 13A.

Each of FIGS. 12A and 13A illustrates not only a portion of the color filter substrate including the color filter 40 or 50 but also source bus lines 14 and gate bus lines 15 on an active-matrix substrate as well.

A set of color filters included in the color filter substrate of this preferred embodiment together form columnar color filters as in the color filters shown in FIGS. 10A and 10B or FIGS. 11A and 11B.

Each and every columnar color filter in the color filter substrate of this preferred embodiment includes not only a TFT shielding recess for shielding a TFT on the active-matrix substrate at the same position but also an area-adjusting recess at the same position.

In the columnar A-color filter 40a shown in FIGS. 12A and 12B, the second side 42 thereof includes a TFT shielding recess 42T, which is made up of upper and lower edges 42T4 and 42T3 with a width TXA in the row direction 22 and a bottom edge 42T2 with a length TYA in the column direction 24.

In addition, the first side 41 thereof includes an area-adjusting recess 41T, which is made up of upper and lower edges 41T3 and 41T4 with a width TTXA in the row direction 22 and a bottom edge 41T1 with a length TTYA in the column direction 24.

In this A-color filter 40, the TFT shielding recess 42T and the area-adjusting recess 41T are arranged so as to face each other diagonally.

The recesses 42T and 41T both preferably have a substantially rectangular shape. The upper and lower edges 42T4 and 42T3 of the recess 42T extend substantially parallel to each other in the row direction 22. In the same way, the upper and lower edges 41T3 and 41T4 of the recess 41T also extend substantially parallel to each other in the row direction 22. On the other hand, the bottom edge 42T2 of the recess 42T and the bottom edge 41T2 of the recess 41T extend in the column direction 24.

It should be noted that the recess 42T does not have to be substantially rectangular as long as the length of the recess 42T in the column direction 24 is substantially constant in the row direction (i.e., if the gap TYA between the upper and lower edges 42T4 and 42T3 of the recess 42T is substantially constant in the row direction 22). In the same way, the recess 41T does not have to be substantially rectangular, either, as long as the length of the recess 41T in the column direction 24 is substantially constant in the row direction (i.e., if the gap TTYA between the upper and lower edges 41T3 and 41T4 of the recess 41T is substantially constant in the row direction 22).

The second side 42 of the columnar A-color filter 40a at each linking portion 45 is included in the bottom edge 42T2 of its associated recess 42T that is provided for the columnar A-color filter 40a. That is to say, the second side 42 at the linking portion 45 and the bottom edge 42T2 of the recess 42T are the same segment.

The upper edge 41T3 of each area-adjusting recess 41T is leveled with the lower edge 42T3 of its associated TFT shielding recess 42T in the column direction 24. Also, the width TTXA of the area-adjusting recess 41T in the row direction is equal to the width TXA of the TFT shielding recess 42T in the row direction.

The length TTYA of the area-adjusting recess 41T in the column direction 24 is substantially equal to or greater than the length of the linking portion 45 in the column direction 24.

The length TYA of the bottom edge 42T2 of the recess 42T is preferably substantially equal to or greater than the alignment margin in the column direction. On the other hand, the width TXA of the upper and lower edges 42T4 and 42T3 of the recess 42T is preferably substantially equal to or greater than the alignment margin in the row direction.

If the color filter substrate and an active-matrix substrate are bonded together so as to satisfy an ideal positional relationship, the linking portions 45 of the columnar A-color filter 40a shown in FIGS. 12A and 12B are closer to the end of the −y direction 24B than the counterparts of the columnar A-color filter 40a shown in FIGS. 10A and 10B. Also, in the columnar A-color filter 40a shown in FIGS. 12A and 12B, the second side 42 at each linking portion 45 is located at the bottom of the bottom edge 42T2 of the TFT shielding recess 42T. Accordingly, if only the TFT shielding recesses 42T are provided for the columnar A-color filter 40a shown in FIGS. 12A and 12B, then the area of each A-color filter 40 may change in case of misalignment occurring in the −y direction 24B. Thus, by additionally providing the area-adjusting recesses 41T, even if the linking areas 45 have shifted in the −y direction 24B, each A-color filter 40 can still maintain a constant area.

Consequently, in the columnar A-color filter 40a shown in FIGS. 12A and 12B, as well as in the columnar A-color filter 40a shown in FIGS. 10A and 10B, even if the linking portions 45 have shifted in the column direction 24 due to misalignment that has occurred in the column direction, the substantive area of each A-color filter 40, associated with one pixel, can be maintained at, and never changes from, the constant value SA.

In the columnar B-color filter 50a shown in FIGS. 13A and 13B, the second side 52 thereof includes a TFT shielding recess 52T, which is made up of upper and lower edges 52T4 and 52T3 with a width TXB in the row direction 22 and a bottom edge 52T2 with a length TYB in the column direction 24. The recess 52T preferably has a substantially rectangular shape. The upper and lower edges 52T4 and 52T3 of the recess 52T extend substantially parallel to each other in the row direction 22. On the other hand, the bottom edge 52T2 of the recess 52T extends in the column direction 24.

In addition, the first side 51 of the columnar B-color filter 50a includes an area-adjusting recess 51T, which is made up of upper and lower edges 51T3 and 51T4 with a width TTXB in the row direction 22 and a bottom edge 51T1 with a length TTYB in the column direction 24.

It should be noted that neither the recesses 41T and 42T nor the recesses 51T and 52T have to be substantially rectangular. The recess 51T of the columnar B-color filter 50a is located at the same position as the recess 41T of the columnar A-color filter 40a. Also, the recess 52T of the columnar B-color filter 50a is located at the same position as the recess 42T of the columnar A-color filter 40a.

The second side 52 of the columnar B-color filter 50a at each linking portion 55 is included in the bottom edge 52T2 of its associated recess 52T that is provided for the columnar B-color filter 50a. That is to say, the second side 52 at the linking portion 55 and the bottom edge 52T2 of the recess 52T are the same segment. The upper edge 51T3 of each area-adjusting recess 51T is leveled with the lower edge 52T3 of its associated TFT shielding recess 52T in the column direction 24. Also, the width TTXB of the area-adjusting recess 51T in the row direction is substantially equal to the width TXB of the TFT shielding recess 52T in the row direction. The length TTYB of the area-adjusting recess 51T in the column direction 24 is substantially equal to or greater than the length of the linking portion 55 in the column direction 24.

The length TYB of the bottom edge 52T2 of the recess 52T in the columnar B-color filter 50a is preferably substantially equal to the length TYA of the bottom edge 42T2 of the recess 42T in the columnar A-color filter 40a. The length TTYB of the bottom edge 5T1 of the recess 51T in the columnar B-color filter 50a is preferably substantially equal to the length TTYA of the bottom edge 41T1 of the recess 41T in the columnar A-color filter 40a. The width TXB of the upper and lower edges 52T4 and 52T3 of the recess 52T is preferably substantially equal to or greater than the alignment margin in the row direction.

The columnar B-color filter 50a includes not only the TFT-shielding recesses 52T and area-adjusting recesses 51T but also recesses 51R and 52R on its first and second sides 51 and 52, respectively.

The recess 51R provided on the first side 51 has a width NB1 in the row direction and a length MB1 in the column direction. The recess 52R provided on the second side 52 has a width NB2 in the row direction and a length MB2 in the column direction. Both of these recesses 51R and 52R are preferably substantially rectangular. The recess 51R is made up of upper and lower edges 51R3 and 51R4 and a bottom edge 51R1. The upper and lower edges 51R3 and 51R4 extend substantially parallel to each other in the row direction 22, while the bottom edge 51R1 extends in the column direction 24. In the same way, the recess 52R is also made up of upper and lower edges 52R3 and 52R4 and a bottom edge 52R2. The upper and lower edges 52R3 and 52R4 extend substantially parallel to each other in the row direction 22, while the bottom edge 52R2 extends in the column direction 24.

Not only in the columnar A-color filter 40a described above but also in this columnar B-color filter 50a, if misalignment has occurred in the column direction, then the linking portion 55 shifts in the column direction 24. However, as long as the magnitude of misalignment is within the alignment margin in the column direction 24, the area of the linking portion 55 remains the same. Accordingly, even if misalignment has occurred in the column direction, the substantive area of each B-color filter 50, associated with a single pixel, can be maintained at, and never changes from, the constant value SB in the columnar B-color filter 50a as in the columnar A-color filter 40a.

As already described with reference to FIG. 10B, the lengths and widths of the four sides of the A-color filter 40 shown in FIG. 12B are identified by $L^o_{(A1)}$, $L^o_{(A2)}$, $L^o_{(A3)}$ and $L^o_{(A4)}$, respectively. Also, as already described with reference to FIG. 11B, the lengths and widths of the four sides of the B-color filter 50 shown in FIG. 13B are identified by $L^o_{(B1)}$, $L^o_{(B2)}$, $L^o_{(B3)}$ and $L^o_{(B4)}$, respectively.

$L^o_{(A1)}$ is the length of the first side 41 of the A-color filter 40 extending in the y direction except that of the area-adjusting recess 41T provided at the same position for the A-color and B-color filters 40 and 50. $L^o_{(A2)}$ is the length of the second side 42 of the A-color filter 40 extending in the y direction except that of the TFT shielding recess 42T provided at the same position for the A-color and B-color filters 40 and 50. $L^o_{(A3)}$ and $L^o_{(A4)}$ are the widths of the third and fourth sides 43 and 44 of the A-color filter 40 extending in the x direction except those of the TFT shielding recess 42T and area-adjusting recess 41T provided at the same positions for the A-color and B-color filters 40 and 50.

In the same way, $L^o_{(B1)}$ is the length of the first side 51 of the B-color filter 50 extending in the y direction except that of the area-adjusting recess 51T provided at the same position for the A-color and B-color filters 40 and 50. $L^o_{(B2)}$ is the length of the second side 52 of the B-color filter 50 extending in the y direction except that of the TFT shielding recess 52T provided at the same position for the A-color and B-color filters 40 and 50. $L^o_{(B3)}$ and $L^o_{(B4)}$ are the widths of the third and fourth sides 53 and 54 of the B-color filter 50 extending in the x direction except those of the TFT shielding recess 52T and area-adjusting recess 51T provided at the same positions for the A-color and B-color filters 40 and 50.

As already described with reference to FIG. 10B, the lengths and widths of the four sides of the A-color filter 40 shown in FIG. 12B may be identified by $L_{(A1)}$, $L_{(A2)}$, $L_{(A3)}$ and $L_{(A4)}$, respectively. Then, the A-color filter 40 preferably satisfies $L_{(A1)} = L^o_{(A1)}$, $L_{(A2)} = L^o_{(A2)}$, $L_{(A3)} = L^o_{(A3)}$ and $L_{(A4)} = L^o_{(A4)}$. As already described with reference to FIG. 11B, the lengths and widths of the four sides of the B-color filter 50 shown in FIG. 13B may be identified by $L_{(B1)}$, $L_{(B2)}$, $L_{(B3)}$ and $L_{(B4)}$, respectively. In that case, the B-color filter 50 preferably satisfies $L^o_{(B1)} > L_{(B1)}$, $L^o_{(B2)} > L_{(B2)}$, $L^o_{(B1)} = L_{(B1)} + MB1$ and $L^o_{(B2)} = L_{(B2)} + MB2$.

The recesses 51R and 52R are designed such that the equations $L_{(B1)}/L_{(A1)} = SB/SA$ and $L_{(B2)}/L_{(A2)} = SB/SA$ are satisfied. If the recesses 51R and 52R are defined so as to satisfy these equations and if the shift of the active-matrix substrate with respect to the color filter substrate in the row direction 22 is at most equal to the width of the recess 51R or 52R in the row direction, then the ratio of the effective display area of the A-color filter 40 to that of the B-color filter 50 can always be equal to the ratio of the overall area SA of the A-color filter 40 to the overall area SB of the B-color filter 50 irrespective of the magnitude of the misalignment.

In the color filter substrate of the preferred embodiment described above, if misalignment has occurred in the column direction, the substantive area of each color filter can be maintained at a constant value. On the other hand, if misalignment has occurred in the row direction, the substantive area ratio of multiple color filters can be maintained. Accordingly, even if misalignment has occurred in both of the column and row directions, the substantive area ratio of multiple color filters can be maintained and the white chromaticity never varies from its desired value.

Figure 14:
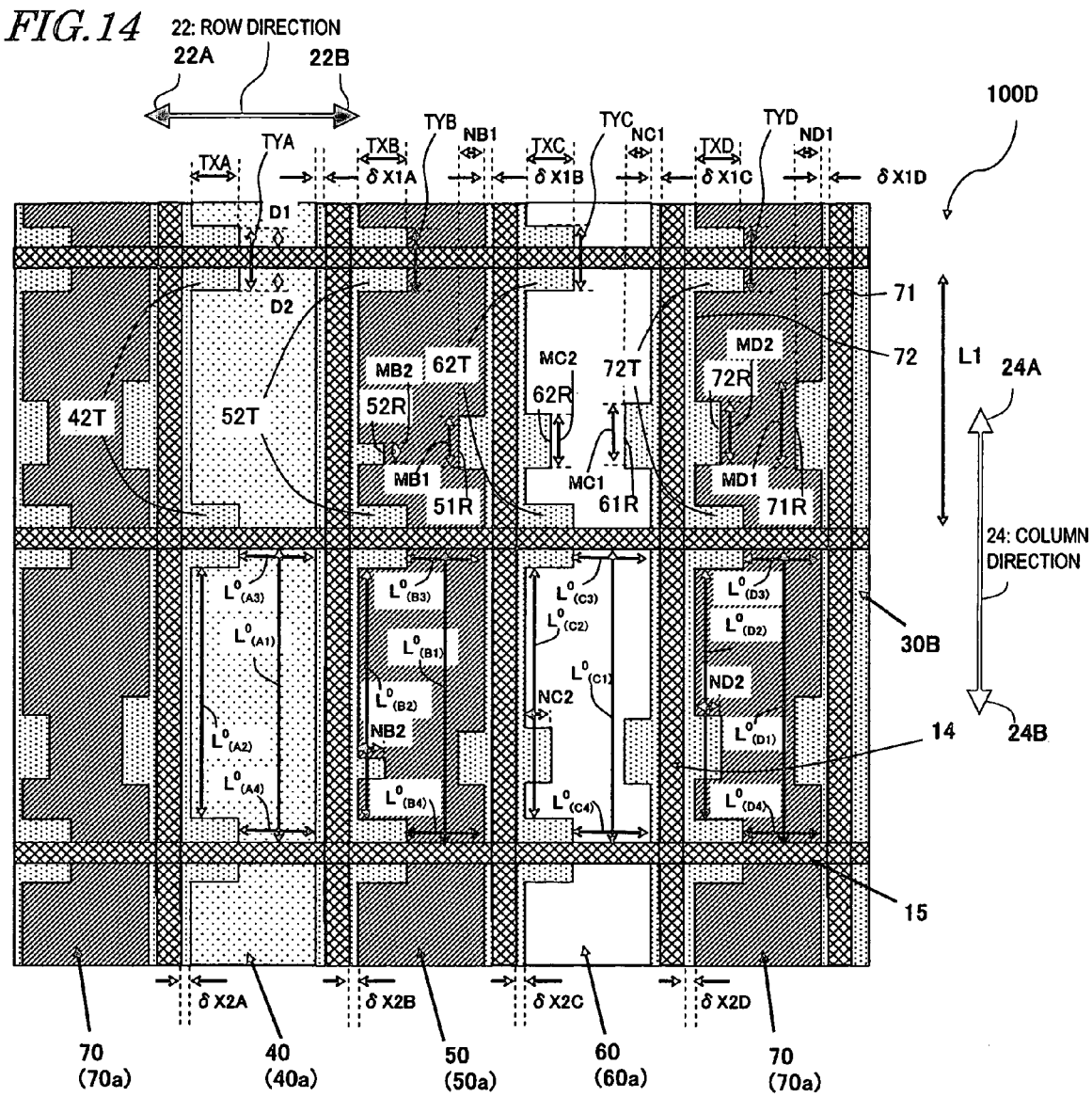
FIG. 14 is a plan view illustrating a color filter substrate according to another preferred embodiment of the present invention.

FIG. 14 is a plan view of a color filter substrate 100D including the color filters shown in FIGS. 10A, 10B, 11A and 11B. The color filter substrate 100D may include color filters in four colors (e.g., red, green, blue and white). If a reflective liquid crystal display device is fabricated with such a color filter substrate including color filters in four colors, then the resultant brightness and chromaticity can be increased effectively as compared with a device having a color filter substrate including color filters in three colors (see Japanese Laid-Open Publication No. 2001-296523, for example). It should be noted that source bus lines 14 and gate bus lines 15 on an opposing active-matrix substrate to be bonded to the color filter substrate 100D are also illustrated in FIG. 14.

The color filter substrate 100D preferably includes A-color filters 40, B-color filters 50, C-color filters 60, D-color filters 70 and a light shielding layer 30 on a substrate 102 of glass, for example. The areas SA, SB, SC and SD of the A-, B-, C- and D-color filters 40, 50, 60 and 70 may satisfy the inequality SA>SB>SC>SD, for example.

In color filters of each of these four types, a columnar color filter is made up of a number of color filters, associated with vertically adjacent pixel rows, and linking portions that link the color filters together. Specifically, a columnar A-color filter 40a is made up of a series of A-color filters 40, which are adjacent to each other vertically (i.e., in the column direction), and linking portions 45. A columnar B-color filter 50a is made up of a series of vertically adjacent B-color filters 50 and linking portions 55. A columnar C-color filter 60a is made up of a series of vertically adjacent C-color filters 60 and linking portions 65. And a columnar D-color filter 70a is made up of a series of vertically adjacent D-color filters 70 and linking portions 75.

The alignment margins in the row and column directions 22 and 24 may be both about ±5 µm, for example.

Each and every columnar color filter 40a, 50a, 60a or 70a on the substrate 100D includes a TFT shielding recess 42T, 52T, 62T or 72T at the same position on the second side 42, 52, 62 or 72 thereof. The widths TXA, TXB, TXC and TXD of the TFT shielding recesses 42T, 52T, 62T and 72T in the row direction are preferably substantially equal to or greater than the alignment margin in the row direction. Also, the lengths TYA, TYB, TYC and TYD of the TFT shielding recesses 42T, 52T, 62T and 72T in the column direction are preferably substantially equal to each other and substantially equal to or greater than the alignment margin in the column direction.

Each columnar A-color, B-color, C-color or D-color filter 40a, 50a, 60a or 70a is designed such that its area SA, SB, SC or SD does not change even in case of misalignment occurring in the column direction. If the color filter substrate 100D of this preferred embodiment is bonded to an active-matrix substrate so as to satisfy an ideal positional relationship, the columnar A-color filter 40a, having the greatest area, is symmetric in the column direction with respect to the linking portions 45 (i.e., D1=D2).

Every color filter other than the A-color filter 40 having the greatest area (i.e., each of the B-, C- and D-color filters 50, 60 and 70) includes not only the TFT-shielding recess 52T, 62T or 72T but also two more recesses on the first and second sides thereof. Specifically, each B-color filter 50 includes recesses 51R and 52R on its first and second sides 51 and 52, respectively. The recess 51R on the first side 51 has a width NB1 in the row direction and a length MB1 in the column direction. The recess 52R on the second side 52 has a width NB2 in the row direction and a length MB2 in the column direction. Each C-color filter 60 includes recesses 61R and 62R on its first and second sides 61 and 62, respectively. The recess 61R on the first side 61 has a width NC1 in the row direction and a length MC1 in the column direction. The recess 62R on the second side 62 has a width NC2 in the row direction and a length MC2 in the column direction. Each D-color filter 70 includes recesses 71R and 72R on its first and second sides 71 and 72, respectively. The recess 71R on the first side 71 has a width ND1 in the row direction and a length MD1 in the column direction. The recess 72R on the second side 72 has a width ND2 in the row direction and a length MD2 in the column direction.

Each of these recesses 51R, 52R, 61R, 62R, 71R and 72R provided on the first and second sides of the three types of color filters preferably has a substantially rectangular shape and is arranged so as not to overlap with any gate bus line 15 even in case of misalignment occurring in the column direction.

As shown in FIG. 14, the gap between the portion of the first side 41 of each A-color filter 40 at the end of the +x direction 22B and an adjacent source bus line 14 is identified by δX1A, while the gap between the portion of the second side 42 of each A-color filter 40 at the end of the −x direction 22A and another adjacent source bus line 14 is identified by δX2A. In the same way, those gaps for each B-color filter 50 are identified by δX1B and δX2B, those gaps for each C-color filter 60 are identified by δX1C and δX2C, and those gaps for each D-color filter 70 are identified by δX1D and δX2D.

In this color filter substrate 100D, δX1A=δX1B= δX1C=δX1D=−2 μm and δ2A=δX2B=δX2C=δX2D=2 μm to ensure sufficient brightness for a display device. That is to say, the width of overlap between the portion of the first side of each color filter at the end of the +x direction and an adjacent source bus line 14 is substantially equal to the width of overlap between the portion of the second side of each color filter at the end of the −x direction and another adjacent source bus line 14.

In this preferred embodiment, the alignment margin in the row direction 22 is preferably about ±5 μm. Accordingly, each of the recesses to be provided on the first and second sides of each color filter preferably has a width of at least about 7 μm in the row direction. That is to say, NB1=7.0, NB2≧7.0, NC1≧7.0, NC2≧7.0, ND1≧7.0 and ND2≧7.0 are preferably satisfied.

As shown in FIG. 14, the length of a portion of the first side 41 of each A-color filter 40 extending in the y direction is identified by $L^0_{(A1)}$, the length of a portion of the second side 42 thereof extending in the y direction is identified by $L^0_{(A2)}$, the width of a portion of the third side 43 thereof extending in the x direction is identified by $L^0_{(A3)}$ and the width of a portion of the fourth side 44 thereof extending in the x direction is identified by $L^0_{(A4)}$. In the same way, the length of a portion of the first side 51 of each B-color filter 50 extending in the y direction is identified by $L^0_{(B1)}$, the length of a portion of the second side 52 thereof extending in the y direction is identified by $L^0_{(B2)}$, the width of a portion of the third side 53 thereof extending in the x direction is identified by $L^0_{(B3)}$ and the width of a portion of the fourth side 54 thereof extending in the x direction is identified by $L^0_{(B4)}$. In the same way, the length of a portion of the first side 61 of each C-color filter 60 extending in the y direction is identified by $L^0_{(C1)}$, the length of a portion of the second side 62 thereof extending in the y direction is identified by $L^0_{(C2)}$, the width of a portion of the third side 63 thereof extending in the x direction is identified by $L^0_{(C3)}$ and the width of a portion of the fourth side 64 thereof extending in the x direction is identified by $L^0_{(C4)}$. In the same way, the length of a portion of the first side 71 of each D-color filter 70 extending in the y direction is identified by $L^0_{(D1)}$, the length of a portion of the second side 72 thereof extending in the y direction is identified by $L^0_{(D2)}$, the width of a portion of the third side 73 thereof extending in the x direction is identified by $L^0_{(D3)}$ and the width of a portion of the fourth side 74 thereof extending in the x direction is identified by $L^0_{(D4)}$.

In this case, none of the lengths and widths $L^0_{(A1)}$ through $L^0_{(A4)}$, $L^0_{(B1)}$ through $L^0_{(B4)}$, $L^0_{(C1)}$ through $L^0_{(C4)}$ and $L^0_{(D1)}$ through $L^0_{(D4)}$ includes the length or width of its TFT shielding recess 42T, 52T, 62T or 72T, which is provided at the same position for a color filter in each color.

In this color filter substrate 100D, $L^0_{(A1)}=L^0_{(B1)}=L^0_{(C1)}=L^0_{(D1)}$ and $L^0_{(A2)}=L^0_{(B2)}=L^0_{(C2)}=L^0_{(D2)}$ are satisfied.

Suppose the total length of at least a portion of the first side 41 of each A-color filter 40 at the end of the +x direction is identified by $L_{(A1)}$, the total length of at least a portion of the second side 42 thereof at the end of the −x direction is identified by $L_{(A2)}$, the total width of at least a portion of the third side 43 thereof at the end of the +y direction is identified by $L_{(A3)}$ and the total width of at least a portion of the fourth side 44 thereof at the end of the −y direction is identified by $L_{(A4)}$.

In the same way, suppose the lengths and widths of predetermined portions of each B-color filter 50 are identified by $L_{(B1)}$, $L_{(B2)}$, $L_{(B3)}$ and $L_{(B4)}$, the lengths and widths of predetermined portions of each C-color filter 60 are identified by $L_{(C1)}$, $L_{(C2)}$, $L_{(C3)}$ and $L_{(C4)}$, and the lengths and widths of predetermined portions of each D-color filter 70 are identified by $L_{(D1)}$, $L_{(D2)}$, $L_{(D3)}$ and $L_{(D4)}$.

Each A-color filter 40 includes no recesses but the TFT shielding recess 41T. Accordingly, the A-color filter 40 satisfies $L_{(A1)}=L^0_{(A1)}$, $L_{(A2)}=L^0_{(A2)}$, $L_{(A3)}=L^0_{(A3)}$ and $L_{(A4)}=L^0_{(A4)}$.

Meanwhile, each of the B-color, C-color and D-color filters includes two more recesses on the first and second sides thereof. Thus, the B-color, C-color and D-color filters respectively satisfy $$L^0_{(B1)}=L_{(B1)}+MB1 \text{ and } L^0_{(B2)}=L_{(B2)}+MB2,$$

$$L^0_{(C1)}=L_{(C1)}+MC1 \text{ and } L^0_{(C2)}=L_{(C2)}+MC2, \text{ and}$$

$$L^0_{(D1)}=L_{(D1)}+MD1 \text{ and } L_{(D2)}=L_{(D2)}+MD2.$$

The recesses 51R, 52R, 61R, 62R, 71R and 72R are provided so as to satisfy the equations of:

$$L_{(B1)}/L_{(A1)}=L_{(B2)}/L_{(A2)}=SB/SA$$

$$L_{(C1)}/L_{(A1)}=L_{(C2)}/L_{(A2)}=SC/SA \text{ and}$$

$$L_{(D1)}/L_{(A1)}=L_{(D2)}/L_{(A2)}=SD/SA.$$

By providing the recesses such that these equations are satisfied, as long as the magnitude of misalignment of the active-matrix substrate with respect to the color filter substrate in the row direction 22 is substantially equal to or smaller than the alignment margin in the row direction 22, the ratio of the effective display areas of the A-color, B-color, C-color and D-color filters 40, 50, 60 and 70 can be substantially equal to the ratio of the overall areas SA, SB, SC and SD of the A-color, B-color, C-color and D-color filters 40, 50, 60 and 70 no matter how much the misalignment is and whether the misalignment occurred in the row direction 22A or in the row direction 22B.

As described above, in each columnar color filter, no color filter changes its substantive area even in case of misalignment occurring in the column direction. Accordingly, if a liquid crystal display device is fabricated using the color filter substrate of this preferred embodiment, then the area ratio of the respective color filters can be maintained at a constant value no matter whether the misalignment occurred in the column direction or in the row direction. Consequently, not only the white balance but also the chromaticities of all colors to be displayed can be maintained.

It should be noted that FIGS. 8 through 14 illustrate a situation where the color filter substrate and an active-matrix substrate are bonded together so as to satisfy an ideal positional relationship without causing any misalignment between them.

A color filter substrate according to any of the preferred embodiments of the present invention described above includes light shielding portions in the recesses of its color filters, regions associated with TFTs (i.e., TFT shielding portions), and gaps between adjacent color filters. However, a color filter substrate according to an alternative preferred embodiment of the present invention may include no light shielding portions at all.

For example, the light shielding portions may be replaced with a white colored layer (e.g., a transparent resin layer) with almost no shielding function. As another alternative, the surface of the glass substrate may be partially exposed without providing such a white colored layer. If the recesses are provided for predetermined sides of color filters with either the chromaticity of the white colored layer or the exposed surface of the glass substrate matched with that of the overall liquid crystal display device in white display mode, then the variation in chromaticity in the white display mode can be minimized even in case of misalignment. In particular, if the respective color filters are designed such that the substantive area ratio thereof does not change even in case of misalignment, the chromaticity in the white display mode can be maintained in spite of the misalignment. However, there is no need to match the brightness of the white colored layer or the exposed portion of the glass substrate with that of the overall liquid crystal display device in the white display mode.

Even in making a color filter substrate with color filters in the four colors of red, green, blue and white, the light shielding portions may also be replaced with a white colored layer or the surface of the substrate may be partially exposed. In that case, however, the white color filters cannot be distinguished from the white colored layer that is provided in place of the light shielding portions. Accordingly, unlike the color filter substrate 100D shown in FIG. 14, there is no need to provide any area-adjusting recesses for the white color filters.

In the preferred embodiments of the present invention described above, the pixels preferably have a substantially rectangular shape. However, a color filter substrate according to any of various preferred embodiments of the present invention described above may be combined with a substrate including non-rectangular pixels. Furthermore, the positions and shapes of the recesses of the color filters are not limited to the illustrated ones but may be appropriately determined in view of the shape of the pixels and the alignment margins.

Each of the color filter substrates 10A, 100B and 100C shown in FIGS. 1, 5 and 6 may be modified so as to include color filters in four colors as in the color filter substrate 100D shown in FIG. 14. Conversely, the color filter substrate 100D shown in FIG. 14 may also be modified so as to include color filters in three colors as in the color filter substrate 100A, 100B or 100C shown in FIG. 1, 5 or 6. Furthermore, each of the color filter substrates 100A, 100B, 100C and 100D shown in FIGS. 1, 5, 6 and 14 may also be expanded so as to include color filters in six colors consisting of red, green, blue, cyan, magenta and yellow, for example. By using color filters in those six colors, neutral colors can be represented more naturally as compared with a color filter substrate including color filters in three colors. A color filter substrate including columns of color filters in those six colors is disclosed in detail in Japanese Laid-Open Publication No. 2002-286927, for example.

The present invention is applicable for use in any of various types of liquid crystal display devices including transmissive, reflective and transflective (semi-transmissive) display devices. Also, the present invention is not limited to any particular color filter arrangement but may be broadly applicable for use in not just the striped arrangement described above but also a delta arrangement as well. Furthermore, the present invention is not limited to any LCD display mode, either, but works effectively in TN, MVA, IPS and other display modes. Moreover, the present invention can also be used in any of numerous types of color display devices including a display device with a non-liquid-crystal display medium layer (e.g., an electrophoretic layer).

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC §119(a) of Patent Applications No. 2003-023657 filed in Japan on Jan. 31, 2003, and No. 2003-434624 filed in Japan on Dec. 26, 2003, the entire contents of which are hereby incorporated by reference.

What is claimed is:

1. A color filter substrate for use in a display device including pixels that are arranged in a matrix so as to define columns of pixels in a column direction and rows of pixels in a row direction, respectively, the color filter substrate comprising:

a plurality of color filters, each of which is associated with one of the pixels and which include at least two A-color filters in a first color and at least two B-color filters in a second color; wherein each of said rows of pixels is associated with a group of color filters including at least one of the A-color filters and at least one of the B-color filters;

each of said A-color filters has a first side and a second side that define a width thereof in the row direction;

each of said B-color filters has a first side and a second side that define a width thereof in the row direction, and an area SA of each of said A-color filters is greater than an area SB of each of said B-color filters; and the first side of each of said B-color filters has at least one first-type recess, the at least one first-type recess being formed so as to extend from the first side toward the second side thereof in the row direction, and the first side of each of said B-color filters is substantially the same as the first side of each of said A-color filters except that the at least one first-type recess is formed thereon.

2. The color filter substrate of claim 1, wherein a sum MB1 of the lengths of the at least one first-type recess of each of said B-color filters as measured in the column direction is substantially constant in the row direction.

3. The color filter substrate of claim 1, wherein an +x direction is defined as extending from the second side toward the first side of each of said A-color filters in the row direction, LA1 is a total length of at least a portion of the first side of each of said A-color filters at the end of the +x direction, and MB1 is the sum of the lengths of the at least one first-type recess of each of said B-color filters as measured in the column direction, the color filter substrate satisfies the equation MB1/LA1=(SA−SB)/SA.

4. The color filter substrate of claim 1, wherein the width of the at least one first-type recess in the row direction is substantially equal to or greater than an alignment margin in the row direction.

5. The color filter substrate of claim 1, wherein the second side of each of said B-color filters has at least one second-type recess, the at least one second-type recess being formed so as to extend from the second side toward the first side thereof in the row direction, and the second side of each of said B-color filters is substantially the same as the second side of each of said A-color filters except that the at least one second-type recess is formed thereon.

6. The color filter substrate of claim 5, wherein a sum MB2 of the lengths of the at least one second-type recess of each of said B-color filters as measured in the column direction is substantially constant in the row direction.

7. The color filter substrate of claim 5, wherein an −x direction is defined as extending from the first side toward the second side of each of said A-color filters in the row direction, LA2 is the total length of at least a portion of the second side of each of said A-color filters at the end of the −x direction, and MB2 is the sum of the lengths of the at least one second-type recess of each of said B-color filters as measured in the column direction, the color filter substrate satisfies the equation MB2/LA2=(SA−SB)/SA.

8. The color filter substrate of claim 5, wherein the width of the at least one second-type recess in the row direction is substantially equal to or greater than an alignment margin in the row direction.

9. The color filter substrate of claim 1, wherein the color filters further include at least two C-color filters in a third color, which is different from the first color of the A-color filters or the second color of the B-color filters, each of said rows of pixels is associated with a group of color filters including not only at least one of the A-color filters and at least one of the B-color filters but also at least one of the C-color filters, each of said C-color filters has a first side and a second side that define a width in the row direction, an area SA of each said A-color filter, an area SB of each said B-color filter and an area SC of each said C-color filter satisfy the inequalities SA>SB and SA>SC, and the first side of each of said C-color filters has at least one third-type recess, the at least one third-type recess being formed so as to extend from the first side toward the second side thereof in the row direction, and the first side of each of said C-color filters is substantially the same as the first side of each of said A-color filters except that the at least one third-type recess is formed thereon.

10. The color filter substrate of claim 9, wherein a sum MC1 of the lengths of the at least one third-type recess of each of said C-color filters as measured in the column direction is substantially constant in the row direction.

11. The color filter substrate of claim 9, wherein an +x direction is defined as extending from the second side toward the first side of each of said A-color filters in the row direction, LA1 is the total length of at least a portion of the first side of each of said A-color filters at the end of the +x direction, and MC1 is the sum of the lengths of the at least one third-type recess of each of said C-color filters as measured in the column direction, the color filter substrate satisfies the equation MC1/LA1=(SA−SC)/SA.

12. The color filter substrate of claim 9, wherein the width of the at least one third-type recess in the row direction is substantially equal to or greater than an alignment margin in the row direction.

13. The color filter substrate of claim 9, wherein the color filters further include at least two D-color filters in a fourth color, which is different from the first color of the A-color filters, the second color of the B-color filters or the third color of the C-color filters, each of said rows of pixels is associated with a group of color filters including not only at least one of the A-color filters, at least one of the B-color filters and at least one of the C-color filters but also at least one of the D-color filters, each of said D-color filters has a first side and a second side that define a width thereof in the row direction, an area SA of each of said A-color filters, an area SB of each of said B-color filters, an area SC of each of said C-color filters and an area SD of each of said D-color filters satisfy the inequalities SA>SB, SA>SC and SA>SD, and the first side of each of said D-color filters has at least one fourth-type recess, the at least one fourth-type recess being formed so as to extend from the first side toward the second side thereof in the row direction, and the first side of each of said D-color filters is substantially the same as the first side of each of said A-color filters except that the at least one fourth-type recess is formed thereon.

14. The color filter substrate of claim 13, wherein a sum MD1 of the lengths of the at least one fourth-type recess of each said D-color filter as measured in the column direction is substantially constant in the row direction.

15. The color filter substrate of claim 13, wherein an +x direction is defined as extending from the second side toward the first side of each of said A-color filters in the row direction, LA1 is the total length of at least a portion of the first side of each of said A-color filters at the end of the +x direction, and MD1 is the sum of the lengths of the at least one fourth-type recess of each of said D-color filters as measured in the column direction, the color filter substrate satisfies the equation MD1/LA1=(SA−SD)/SA.

16. The color filter substrate of claim 13, wherein the width of the at least one fourth-type recess in the row direction is substantially equal to or greater than an alignment margin in the row direction.

17. The color filter substrate of claim 1, wherein the rows of pixels include a first row and a second row, which are adjacent to each other in the column direction, and one of the A-color filters associated with the first row, another one of the A-color filters associated with the second row, and a linking portion for linking together the A-color filters associated with the first and second rows define a columnar A-color filter.

18. The color filter substrate of claim 17, wherein the columnar A-color filter has a first side and a second side that define a width thereof in the row direction, the columnar A-color filter has a recess on the second side thereof, the second side of the linking portion is included in a bottom edge of the recess provided for the columnar A-color filter, and the length of the recess on the second side of the columnar A-color filter as measured in the column direction is substantially constant in the row direction.

19. The color filter substrate of claim 17, wherein the columnar A-color filter has a first side and a second side that define a width thereof in the row direction, the columnar A-color filter has a recess on each of the first and second sides thereof, the second side of the linking portion is included in a bottom edge of the recess provided on the second side of the columnar A-color filter, the upper edge of the recess provided on the first side of the columnar A-color filter is leveled in the column direction with the lower edge of the recess provided on the second side of the columnar A-color filter, the width of the recess provided on the first side of the columnar A-color filter as measured in the row direction is substantially equal to that of the recess provided on the second side thereof, and each of the lengths of the recesses on the first and second sides of the columnar A-color filter as measured in the column direction is substantially constant in the row direction.

20. The color filter substrate of claim 19, wherein as measured in the column direction, the length of the recess provided on the first side of the columnar A-color filter is substantially equal to or greater than that of the linking portion.

21. The color filter substrate of claim 17, wherein the rows of pixels include the first and second rows that are adjacent to each other in the column direction, one of the B-color filters associated with the first row, another one of the B-color filters associated with the second row, and a linking portion for linking together the B-color filters associated with the first and second rows define a columnar B-color filter.

22. The color filter substrate of claim 17, wherein the color filters include at least two C-color filters in a third color, which is different from the first color of the A-color filters or the second color of the B-color filters, each of said rows of pixels is associated with a group of color filters including not only at least one of the A-color filters and at least one of the B-color filters but also at least one of the C-color filters, each of said C-color filters has a first side and a second side that define a width thereof in the row direction, an area SA of each of said A-color filters, an area SB of each said B-color filter and an area SC of each said C-color filter satisfy the inequalities SA>SB and SA>SC, the first side of each of said C-color filters has at least one third-type recess, the at least one third-type recess being formed so as to extend from the first side toward the second side thereof in the row direction, and the first side of each of said C-color filters is substantially the same as the first side of each of said A-color filters except that the at least one third-type recess is formed thereon, the rows of pixels include the first and second rows that are adjacent to each other in the column direction, and one of the C-color filters associated with the first row, another one of the C-color filters associated with the second row, and a linking portion for linking together the C-color filters associated with the first and second rows define a columnar C-color filter.

23. The color filter substrate of claim 17, wherein the color filters include at least two D-color filters in a fourth color, which is different from the first color of the A-color filters, the second color of the B-color filters or the third color of the C-color filters, each of said row of pixels is associated with a group of color filters including not only at least one of the A-color filters, at least one of the B-color filters and at least one of the C-color filters but also at least one of the D-color filters, each of said D-color filters has a first side and a second side that define a width thereof in the row direction, an area SA of each of said A-color filters, an area SB of each of said B-color filters, an area SC of each of said C-color filters and an area SD of each of said D-color filters satisfy the inequalities SA>SB, SA>SC and SA>SD, the first side of each of said D-color filters has at least one fourth-type recess, the at least one fourth-type recess being formed so as to extend from the first side toward the second side thereof in the row direction, and the first side of each of said D-color filters is substantially the same as the first side of each of said A-color filters except that the at least one fourth-type recess is formed thereon, the rows of pixels include the first and second rows that are adjacent to each other in the column direction, and one of the D-color filters associated with the first row, another one of the D-color filters associated with the second row, and a linking portion for linking together the D-color filters associated with the first and second rows define a columnar D-color filter.

24. A display device comprising the color filter substrate of claim 1.

* * * * *